United States Patent
Huang et al.

(10) Patent No.: US 11,051,307 B2
(45) Date of Patent: Jun. 29, 2021

(54) RESOURCE ALLOCATION NOTIFICATION METHOD, AND APPARATUS

(71) Applicant: Huawei Technologies Co., Ltd., Shenzhen (CN)

(72) Inventors: Lei Huang, Shanghai (CN); Zhenyu Shi, Shanghai (CN); Yingpei Lin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/212,104

(22) Filed: Dec. 6, 2018

(65) Prior Publication Data

US 2019/0110285 A1 Apr. 11, 2019

Related U.S. Application Data

(63) Continuation of application No. PCT/CN2016/103105, filed on Oct. 24, 2016.

(30) Foreign Application Priority Data

Jun. 7, 2016 (CN) .......................... 201610404084.4

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0055* (2013.01); *H04W 72/04* (2013.01);
(Continued)

(58) Field of Classification Search
None
See application file for complete search history.

(56) References Cited

U.S. PATENT DOCUMENTS

2013/0265907 A1  10/2013  Kim et al.
2014/0079016 A1   3/2014  Dai et al.
(Continued)

FOREIGN PATENT DOCUMENTS

CN    102160447 A    8/2011
CN    102497640 A    6/2012
(Continued)

OTHER PUBLICATIONS

Park et al, "Multi-Channel Operation in 11ay," IEEE 802.11-16/0401, Institute of Electrical and Electronics Engineers, New York, New York, (Mar. 2016).
(Continued)

*Primary Examiner* — Kodzovi Acolatse
*Assistant Examiner* — The Hy Nguyen
(74) *Attorney, Agent, or Firm* — Leydig, Voit & Mayer, Ltd.

(57) ABSTRACT

A resource allocation notification method, in which a wireless access point receives capability information of a terminal device; and after receiving the capability information of the terminal device, the wireless access point determines, according to the capability information, to use one or more channel extension types to allocate a channel to the terminal device, and sends channel allocation information and/or channel extension type information to the terminal device, where the channel allocation information indicates that the terminal device sends and receives data on one or more channels, and the channel extension type information indicates the one or more channel extension types that the wireless access point determines to use.

19 Claims, 20 Drawing Sheets

| Element ID | Length | Allocation 1 | Allocation 2 | ... | Allocation n |
|---|---|---|---|---|---|

| Allocation ID | Source AID | Destination AID | Extension Type | Channel Allocation | ... |
|---|---|---|---|---|---|

(51) Int. Cl.
*H04W 8/24* (2009.01)
*H04W 84/12* (2009.01)

(52) U.S. Cl.
CPC ... *H04W 72/0446* (2013.01); *H04W 72/0453* (2013.01); *H04W 8/24* (2013.01); *H04W 84/12* (2013.01)

(56) References Cited

U.S. PATENT DOCUMENTS

| | | |
|---|---|---|
| 2014/0313901 A1 | 10/2014 | Yacovitch |
| 2014/0355537 A1 | 12/2014 | Seok |
| 2015/0173015 A1 | 6/2015 | Lee et al. |
| 2015/0230233 A1 | 8/2015 | Kobayashi et al. |
| 2015/0304695 A1 | 10/2015 | Chen et al. |
| 2017/0201992 A1* | 7/2017 | Cordeiro ............. H04W 40/244 |
| 2018/0255537 A1* | 9/2018 | Park ..................... H04L 5/001 |
| 2018/0367650 A1* | 12/2018 | Motozuka ........... H04B 7/0695 |
| 2019/0007964 A1* | 1/2019 | Park ..................... H04W 72/04 |
| 2019/0052395 A1* | 2/2019 | Motozuka ............. H04L 1/0039 |
| 2019/0159239 A1* | 5/2019 | Cariou ............. H04W 72/0453 |
| 2019/0223200 A1* | 7/2019 | Huang ................. H04L 5/0048 |
| 2019/0260446 A1* | 8/2019 | Oteri ................... H04W 72/042 |

FOREIGN PATENT DOCUMENTS

| | | |
|---|---|---|
| CN | 103313100 A | 9/2013 |
| CN | 103416017 A | 11/2013 |
| CN | 104025686 A | 9/2014 |
| CN | 104038331 A | 9/2014 |
| CN | 104080188 A | 10/2014 |
| CN | 104782201 A | 7/2015 |
| EP | 2925066 A1 | 9/2015 |
| EP | 3399823 A1 | 11/2018 |
| JP | 2014502453 A | 1/2014 |
| JP | 2015515826 A | 5/2015 |
| WO | 2014080488 A1 | 5/2014 |
| WO | 2015038175 A1 | 3/2015 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," IEEE Std 802.11ac™-2013, pp. 1-425, Institute of Electrical and Electronics Engineers, New York, New York, (2013).

Information technology—Telecommunications and information exchange between systems—Local and metropolitan area networks—Specific requirements—Part 11:Wireless LAN medium access control (MAC) and physical layer (PHY) specifications Amendment 3: Enhancements for very high throughput in the 60 GHz band (adoption of IEEE Std 802.11ad-2012), ISO/IEC/IEEE 8802-11:2012/Amd.3:2014(E), pp. 1-634, Institute of Electrical and Electronics Engineers, New York, New York, (2014).

Cordeiro, "Specification Framework for TGay," IEEE 80211-15/01358r3, pp. 2-9, Institute of Electrical and Electronics Engineers, New York, New York (Mar. 21, 2016).

Khan et al., "Carrier aggregation/channel bonding in next generation cellular networks: Methods and challenges," IEEE Network, vol. 28, No. 6, pp. 34-40, Institute of Electrical and Electronics Engineers, New York, New York (Nov. 2014).

Verma et al., "Witi on steroids: 802.11AC and 802.11AD," IEEE Wireless Communications, vol. 20, No. 6, pp. 30-35, Institute of Electrical and Electronics Engineers, New York, New York (Dec. 2013).

KR/20187037605, Office Action, dated Jul. 8, 2020.

* cited by examiner

| Allocation ID | Allocation Type | Pseudo-static | Truncatable | Extendable | PCP Active | LP SC Used | Channel Allocation |
|---|---|---|---|---|---|---|---|
| B0 B3 | B4 | B5 | B6 | B7 | B8 | B9 | B10 B15 |
| 4 | 1 | 1 | 1 | 1 | 1 | 1 | 6 |

Bits:

FIG. 5A

| Allocation ID | Allocation Type | Pseudo-static | Truncatable | Extendable | PCP Active | LP SC Used | Channel Allocation |
|---|---|---|---|---|---|---|---|
| B0  B3 | B4  B5 | B6 | B7 | B8 | B9 | B10 | B11  B15 |
| 4 | 2 | 1 | 1 | 1 | 1 | 1 | 5 |

Bits:

FIG. 5B

| Allocation ID | Allocation Type | Pseudo-static | Truncatable | Extendable | PCP Active | LP SC Used | Channel Allocation |
|---|---|---|---|---|---|---|---|
| B0 B3 | B4 B6 | B7 | B8 | B9 | B10 | B11 | B12 B15 |

Bits: 4, 3, 1, 1, 1, 1, 1, 4

FIG. 7A

| Allocation ID | Allocation Type | Pseudo-static | Truncatable | Extendable | PCP Active | LP SC Used | Channel Allocation | Extension Type |
|---|---|---|---|---|---|---|---|---|
| B0 B3 | B4 B6 | B7 | B8 | B9 | B10 | B11 | B12 B14 | B15 |
| 4 | 3 | 1 | 1 | 1 | 1 | 1 | 3 | 1 |

Bits:

FIG. 7B

RESOURCE ALLOCATION NOTIFICATION METHOD, AND APPARATUS

CROSS-REFERENCE TO RELATED APPLICATIONS

This application is a continuation of International Application No. PCT/CN2016/103105, filed on Oct. 24, 2016, which claims priority to Chinese Patent Application No. 201610404084.4, filed on Jun. 7, 2016. The disclosures of the aforementioned applications are hereby incorporated by reference in their entireties.

TECHNICAL FIELD

Embodiments of the present invention relate to the field of wireless communications technologies, and in particular, to a resource allocation notification method and an apparatus that are in a wireless communications system.

BACKGROUND

Increasing a transmission bandwidth in a wireless communications system is a common method for supporting data transmission at a higher rate. For example, in an LTE-Advanced communications system, a maximum of five carriers of 20 MHz can be aggregated by using a carrier aggregation technology, so as to form a transmission bandwidth of 100 MHz, so that a peak downlink transmission rate of up to 1 Gbps can be provided for user equipment. In the IEEE 802.11ac standard, a channel bandwidth is extended from 20 MHz to a maximum of 160 MHz using a channel bonding technology. Carrier aggregation means that multiple data streams are respectively mapped to multiple carriers for transmission. Channel bonding means that bandwidths of multiple adjacent channels are bonded to form a channel with a large bandwidth for transmission of only one data stream. Currently, the IEEE 802.11ay standard for providing an ultrahigh rate service on a frequency band of 60 GHz is under formulation. In this standard, it has agreed that contiguous and noncontiguous channel aggregation are used to provide a service for user equipment. The channel aggregation herein is similar to the carrier aggregation in the LTE-Advanced system; that is, multiple data streams are respectively mapped to multiple channels for transmission.

In the LTE-Advanced system, the user equipment first accesses a primary serving carrier. A base station may add/remove a secondary serving carrier to/from the user equipment using radio resource control (RRC) signaling. The base station schedules radio resources on all serving carriers of the user equipment for the user equipment for data transmission. Although multiple serving carriers scheduled by the base station for user equipment are contiguous in a frequency domain, modulation information, encoding information, resource allocation information, and the like still need to be transmitted for the serving carriers by using independent signaling.

In the proposal [IEEE 802.11-16/0401, Multi-Channel Operation in 11y, 2016-3] submitted to the IEEE 802.11ay by LGE, for channel bonding, LGE proposes that two of four bits reserved in an extended schedule element defined in the IEEE 802.11ad standard are reused, so as to indicate a channel bandwidth allocated to user equipment. The two bits may indicate a maximum of four bandwidths with different sizes. In consideration of channel aggregation, the scheduled channels may be contiguous in the frequency domain, or may be noncontiguous. Therefore, information about the scheduled channels cannot be completely obtained if only bandwidths of the scheduled channels are indicated.

Because an extremely large bandwidth is available on a high frequency band, a channel bonding technology and/or a channel aggregation technology are/is likely to be used in high frequency communication in 5G and post-5G communications standards in the future.

SUMMARY

Embodiments of the present invention provide a resource allocation notification method and an apparatus, so that a receive end can correctly obtain channel allocation information and/or channel extension type information of a transmit end in a wireless communications system that supports multiple channel extension types, for example, in a system that supports both channel aggregation and channel bonding.

A first aspect of the present invention provides a resource allocation notification method. In this method, a wireless access point receives capability information of a terminal device, where the capability information of the terminal device includes one or more of the following items: one or more channel extension types supported by the terminal device, a maximum bandwidth a single channel supported by the terminal device, and a maximum quantity of to-be-aggregated channels supported by the terminal device; and after receiving the capability information of the terminal device, the wireless access point determines, according to the capability information, to use one or more channel extension types to allocate one or more channels to the terminal device, and sends channel allocation information and/or channel extension type information to the terminal device, where the channel allocation information indicates that the terminal device sends and receives data on the one or more channels, and the channel extension type information indicates the one or more channel extension types of the one or more channels that the wireless access point determines to use. The wireless access point uses a corresponding channel extension type according to a capability of the terminal device to perform data transmission, so that multiple channel extension types can be flexibly used in a system, thereby improving system spectrum utilization and increase a system capacity.

In a possible implementation of the first aspect of the present invention, the one or more channel extension types include channel aggregation and/or channel bonding.

In a possible implementation of the first aspect of the present invention, the wireless access point uses a beacon frame or an announce frame to send the channel allocation information and/or the channel extension type information. The channel allocation information and/or the channel extension type information are/is carried in an extended schedule element in the beacon frame or the announce frame. In a possible implementation of the first aspect of the present invention, the channel allocation information and/or the channel extension type information are/is carried in a resource allocation control field in the extended schedule element. In a possible implementation of the first aspect of the present invention, the channel allocation information and/or the channel extension type information are/is carried in a field, for example, the channel allocation information and/or the channel extension type information may be carried in a reserved field in the resource allocation control field, or in a newly defined field. In another implementation, the channel allocation information and/or the channel extension type information are/is carried in two fields, for example, in a reserved field and an allocation type field that are in the resource allocation control field. In another implementation, the channel allocation information is carried in a channel allocation field in the resource allocation field, and the channel extension type information is carried in an extension type field in the resource allocation field.

In a possible implementation of the first aspect of the present invention, the channel allocation information and/or the channel extension type information may be six bits. In another implementation, alternatively, the channel allocation information and/or the channel extension type information may be five or four bits. This depends on a quantity of to-be-indicated possible combinations of channel allocation information and/or channel extension type information.

A second aspect of the present invention provides a resource allocation notification method. In this method, a wireless access point sends a first extended schedule element to a terminal device, where the first extended schedule element carries indication information that indicates that multiple channels are allocated to the terminal device; and the wireless access point sends a second extended schedule element to the terminal device, where the second extended schedule element carries channel allocation information and/or channel extension type information, the channel allocation information indicates information about the multiple channels, and the channel extension type information indicates one or more channel extension types used by the wireless access point to allocate a channel to the terminal device.

In a possible implementation of the second aspect of the present invention, an allocation ID, a source association ID, and a destination association ID that are carried in the first extended schedule element are respectively consistent with an allocation ID, a source association ID, and a destination association ID that are carried in the second extended schedule element.

In a possible implementation of the second aspect of the present invention, the indication information includes one bit, and if a value of the bit is 1, it indicates that multiple channels are allocated to the terminal device. In a possible implementation of the second aspect of the present invention, the indication information includes one bit, and if a value of the bit is 0, it indicates that one channel is allocated to the terminal device.

In a possible implementation of the second aspect of the present invention, the channel allocation information and/or the channel extension type information are/is carried in a resource allocation field in the second extended schedule element. For example, the channel allocation information is carried in a channel allocation field in the resource allocation field, and the channel extension type information is carried in an extension type field in the resource allocation field.

A third aspect of the present invention provides a resource allocation notification method. In this method, a terminal device receives a first extended schedule element, where the first extended schedule element carries indication information that indicates that multiple channels are allocated to the terminal device; and the terminal device receives a second extended schedule element, where the second extended schedule element carries channel allocation information and/or channel extension type information, the channel allocation information indicates information about the multiple channels, and the channel extension type information indicates one or more channel extension types used by the wireless access point to allocate a channel to the terminal device.

In a possible implementation of the third aspect of the present invention, an allocation ID, a source association ID, and a destination association ID that are carried in the first extended schedule element are respectively consistent with an allocation ID, a source association ID, and a destination association ID that are carried in the second extended schedule element.

In a possible implementation of the third aspect of the present invention, the indication information includes one bit, and if a value of the bit is 1, it indicates that multiple channels are allocated to the terminal device. In a possible implementation of the third aspect of the present invention, the indication information includes one bit, and if a value of the bit is 0, it indicates that one channel is allocated to the terminal device.

In a possible implementation of the third aspect of the present invention, the channel allocation information and/or the channel extension type information are/is carried in a resource allocation field in the second extended schedule element. For example, the channel allocation information is carried in a channel allocation field in the resource allocation field, and the channel extension type information is carried in an extension type field in the resource allocation field.

A fourth aspect of the present invention provides a resource allocation notification method. In this method, a terminal device sends capability information of the terminal device to a wireless access point, where the capability information of the terminal device includes one or more of the following items: one or more channel extension types supported by the terminal device, a maximum bandwidth of a single channel supported by the terminal device, and a maximum quantity of to-be-aggregated channels supported by the terminal device; and then the terminal device receives channel allocation information and/or channel extension type information sent by the wireless access point, where the channel allocation information and/or the channel extension type information are/is sent after the wireless access point allocates, according to the capability information of the terminal device, one or more channels to the terminal device, the channel allocation information indicates that the terminal device sends and receives data on one or more channels, and the channel extension type information indicates the one or more channel extension types that the wireless access point determines to use.

In a possible implementation of the fourth aspect of the present invention, the terminal device uses a probe response frame or an association response frame to send the capability information of the terminal device, where the capability information of the terminal device may be carried in a reserved field in the probe response frame or the association response frame.

In a possible implementation of the fourth aspect of the present invention, when the wireless access point allocates multiple channels to the terminal device in a channel bonding manner, after correctly receiving data, the terminal device sends ACK information to the wireless access point on a bonded channel or one of the multiple channels, where the bonded channel is formed by bonding the multiple channels. Sending the ACK information on one of the multiple channels, for example, on a primary channel, can concentrate a transmit power of the ACK information on one channel. This ensures a sending range of an acknowledgement frame, so that transmission reliability of the acknowledgement frame can be improved.

In a possible implementation of the fourth aspect of the present invention, when the wireless access point allocates multiple channels to the terminal device in a channel aggregation manner, after correctly receiving data, the terminal device sends multi-channel ACK information on one or more of the multiple channels, where the multi-channel ACK information indicates data acknowledgement information on each of the multiple channels. Data transmission acknowledgement information on multiple channels is centrally fed back by using one piece of multi-channel ACK information, thereby improving utilization of an acknowledgement frame and feedback efficiency.

In a possible implementation of the fourth aspect of the present invention, when the wireless access point allocates multiple channels to the terminal device in both a channel bonding manner and a channel aggregation manner, after correctly receiving data, the terminal device sends multi-channel ACK information on one or more of the multiple channels, where the multi-channel ACK information indicates data acknowledgement information on a bonded channel and data acknowledgement information on an aggregated channel, and the multiple channels include the bonded channel and the aggregated channel.

A fifth aspect of the present invention provides an acknowledgement information sending method. In this method, a terminal device receives data on multiple channels allocated by a wireless access point; and when the wireless access point allocates the multiple channels to the terminal device in a channel bonding manner, after correctly receiving data, the terminal device sends ACK information to the wireless access point on a bonded channel or one of the multiple channels, where the bonded channel is formed by bonding the multiple channels; or when the wireless access point allocates the multiple channels to the terminal device in a channel aggregation manner, after correctly receiving data, the terminal device sends multi-channel ACK information on one or more of the multiple channels, where the multi-channel ACK information indicates data acknowledgement information on each of the multiple channels; or when the wireless access point allocates the multiple channels to the terminal device in both a channel bonding manner and a channel aggregation manner, after correctly receiving data, the terminal device sends multi-channel ACK information on one or more of the multiple channels, where the multi-channel ACK information indicates data acknowledgement information on a bonded channel and data acknowledgement information on an aggregated channel, and the multiple channels include the bonded channel and the aggregated channel.

A sixth aspect of the present invention provides a wireless access point, includes a transceiver, configured to: receive capability information of a terminal device, where the capability information of the terminal device includes one or more of the following items: one or more channel extension types supported by the terminal device, a maximum bandwidth of a single channel supported by the terminal device, and a maximum quantity of to-be-aggregated channels supported by the terminal device; and send channel allocation information and/or channel extension type information to the terminal device, where the channel allocation information indicates that the terminal device sends and receives data on one or more channels, and the channel extension type information indicates the one or more channel extension types of the one or more channels that the wireless access point determines to use; and a processor, configured to: determine, according to the capability information of the terminal device, to use one or more channel extension types to allocate the one or more channels channel to the terminal device; generate the channel allocation information and/or the channel extension type information; and send the channel allocation information and/or the channel extension type information to the terminal device by using the transceiver.

In a possible implementation of the sixth aspect of the present invention, the processor adds the channel allocation information and/or the channel extension type information to a beacon frame or an announce frame, and sends the channel allocation information and/or the channel extension type information to the terminal device by using the transceiver.

In a possible implementation of the sixth aspect of the present invention, the channel allocation information and/or the channel extension type information are/is carried in a resource allocation field in an extended schedule element in the beacon frame or the announce frame. For example, the channel allocation information is carried in a channel allocation field in the resource allocation field, and the channel extension type information is carried in an extension type field in the resource allocation field.

A seventh aspect of the present invention provides a wireless access point, including: a transceiver, configured to: send a first extended schedule element to a terminal device, where the first extended schedule element carries indication information that indicates that multiple channels are allocated to the terminal device; and send a second extended schedule element to the terminal device, where the second extended schedule element carries channel allocation information and/or channel extension type information, the channel allocation information indicates information about the multiple channels, and the channel extension type information indicates one or more channel extension types used by the wireless access point to allocate a channel to the terminal device; and a processor, configured to: generate the first extended schedule element and the second extended schedule element, and send the first extended schedule element and the second extended schedule element to the terminal device by using the transceiver.

In a possible implementation of the seventh aspect of the present invention, the indication information includes one bit, and if a value of the bit is 1, it indicates that multiple channels are allocated to the terminal device.

In a possible implementation of the seventh aspect of the present invention, the channel allocation information and/or the channel extension type information are/is carried in a resource allocation field in the second extended schedule element. For example, the channel allocation information is carried in a channel allocation field in the resource allocation field, and the channel extension type information is carried in an extension type field in the resource allocation field.

An eighth aspect of the present invention provides a terminal device, including: a transceiver, configured to: send capability information of the terminal device to a wireless access point, where the capability information of the terminal device includes one or more of the following items: one or more channel extension types supported by the terminal device, a maximum bandwidth of a single channel supported by the terminal device, and a maximum quantity of to-be-aggregated channels supported by the terminal device; and receive channel allocation information and/or channel extension type information sent by the wireless access point, where the channel allocation information and/or the channel extension type information are/is sent after the wireless access point allocates, according to the capability information of the terminal device, one or more channels to the terminal device, the channel allocation information indicates that the terminal device sends and receives data on one or more channels; and the channel extension type information indicates the one or more channel extension types of the one or more channels that the wireless access point determines to use; and a processor, configured to: generate the capability information of the terminal device, and send the capability information of the terminal device to the wireless access point by using the transceiver.

In a possible implementation of the eighth aspect of the present invention, the processor adds the capability information of the terminal device to a probe response frame or an association response frame, and sends the capability information of the terminal device to the wireless access point by using the transceiver.

A ninth aspect of the present invention provides a terminal device, including: a transceiver, configured to receive data on multiple channels allocated by a wireless access point; and when the wireless access point allocates the multiple channels to the terminal device in a channel bonding manner, after correctly receiving data, the transceiver sends ACK information to the wireless access point on a bonded channel or one of the multiple channels, where the bonded channel is formed by bonding the multiple channels; or when the wireless access point allocates the multiple channels to the terminal device in a channel aggregation manner, after correctly receiving data, the transceiver sends multi-channel ACK information on one or more of the multiple channels, where the multi-channel ACK information indicates data acknowledgement information on each of the multiple channels; or when the wireless access point allocates the multiple channels to the terminal device in both a channel bonding manner and a channel aggregation manner, after correctly receiving data, the transceiver sends multi-channel ACK information on one or more of the multiple channels, where the multi-channel ACK information indicates data acknowledgement information on a bonded channel and data acknowledgement information on an aggregated channel, and the multiple channels include the bonded channel and the aggregated channel; and a processor, configured to: after the transceiver correctly receives data, generate the ACK information or the multi-channel ACK information, and send the ACK information or the multi-channel ACK information to the wireless access point by using the transceiver.

A tenth aspect of the present invention provides a terminal device, including: a transceiver, configured to: receive a first extended schedule element, where the first extended schedule element carries indication information that indicates that multiple channels are allocated to the terminal device; and receive a second extended schedule element, where the second extended schedule element carries channel allocation information and/or channel extension type information, the channel allocation information indicates information about the multiple channels, and the channel extension type information indicates one or more channel extension types used by the wireless access point to allocate a channel to the terminal device; and a processor, configured to: obtain the channel allocation information and/or the channel extension type information according to the first extended schedule element and the second extended schedule element, and indicate that the transceiver needs to use the multiple channels to send and receive data.

In a possible implementation of the tenth aspect of the present invention, an allocation ID, a source association ID, and a destination association ID that are carried in the first extended schedule element are respectively consistent with an allocation ID, a source association ID, and a destination association ID that are carried in the second extended schedule element.

In a possible implementation of the tenth aspect of the present invention, the indication information includes one bit, and if a value of the bit is 1, it indicates that multiple channels are allocated to the terminal device.

In a possible implementation of the tenth aspect of the present invention, the channel allocation information and/or the channel extension type information are/is carried in a resource allocation field in the second extended schedule element. For example, the channel allocation information is carried in a channel allocation field in the resource allocation field, and the channel extension type information is carried in an extension type field in the resource allocation field.

BRIEF DESCRIPTION OF DRAWINGS

To describe the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 5a is a schematic diagram of an allocation control field format according to an embodiment of the present invention;

FIG. 5b is a schematic diagram of another allocation control field format according to an embodiment of the present invention;

FIG. 7a is a schematic diagram of a third format of an extended schedule element according to an embodiment of the present invention;

FIG. 7b is a schematic diagram of a fourth format of an extended schedule element according to an embodiment of the present invention;

DESCRIPTION OF EMBODIMENTS

Figure 1:
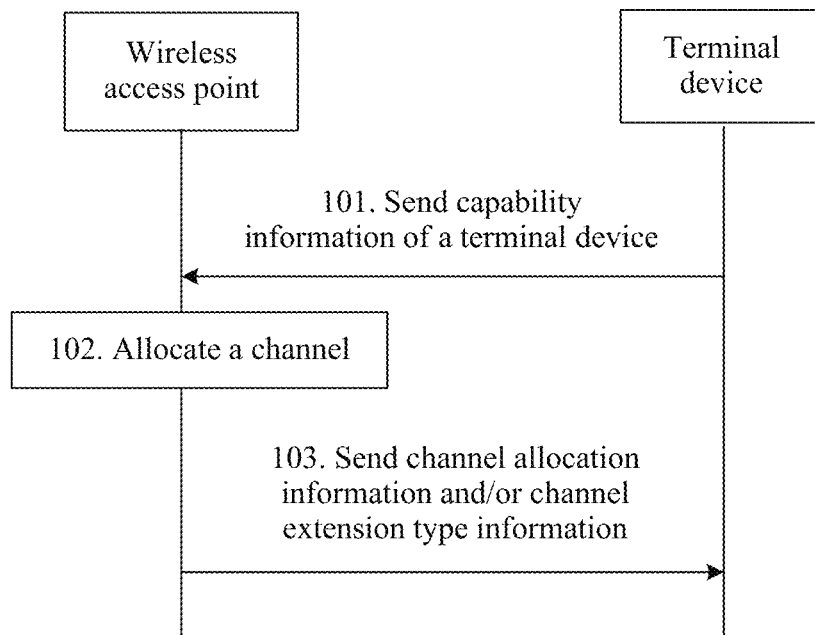
FIG. 1 is a schematic diagram of a resource allocation notification method according to an embodiment of the present invention.

The following clearly describes the technical solutions in the embodiments of the present invention with reference to the accompanying drawings in the embodiments of the present invention.

Based on a wireless communications system that supports multiple channel extension types, the embodiments of the present invention provide a resource allocation notification method and an apparatus, so that a receive end can correctly obtain channel allocation information and channel extension type information of a transmit end. The wireless communications system that supports multiple channel extension types includes at least one base station and at least one user equipment (UE). The communications system may be various radio access technology (RAT) systems, such as a Code Division Multiple Access (CDMA) system, a Time Division Multiple Access (TDMA) system, a Frequency Division Multiple Access (FDMA) system, and an orthogonal frequency division multiple access (OFDMA) system. A radio technology such as Universal Terrestrial Radio Access (UTRA), or CDMA 2000 may be implemented in the CDMA system. A radio technology such as Global System for Mobile Communications (GSM) may be implemented in the TDMA system. A radio technology such as the evolved Universal Terrestrial Radio Access (E-UTRA), the Ultra Mobile Broadband (UMB), the IEEE 802.11 (Wi-Fi), the IEEE 802.16 (WiMAX), the IEEE 802.20, or the Flash OFDMA may be implemented in the OFDMA system. In addition, the communications system is further applicable to a future-oriented communications technology. A person of ordinary skill in the art may learn that as a network architecture evolves and a new service scenario emerges, technical solutions provided in the embodiments of the present invention are also applicable to a similar technical problem.

In the embodiments of the present invention, a base station is an apparatus that is deployed in a radio access network and configured to provide a wireless communication function for UE. The base station may include macro base stations, micro base stations (also referred to as small cells), relay stations, access points, and the like in various forms. In systems in which different radio access technologies are used, devices that have base station functions may have different names.

UE included in the embodiments of the present invention may include various handheld devices, in-vehicle devices, wearable devices, or computing devices that have a wireless communication function, or other processing devices connected to a wireless modem. The UE may also be referred to as a mobile station (MS), a terminal, a terminal device, or may include a smart phone, a wireless data card, a personal digital assistant (PDA) computer, a tablet computer, a wireless modem, a handheld device, a laptop computer, or a wireless local loop (WLL) station, a machine type communications (MTC) terminal, or the like. For ease of description, the devices mentioned above are collectively referred to as UE in all the embodiments of the present invention.

Embodiment 1 describes a communication process of resource allocation notification between a base station and a terminal by using a wireless communications system that supports two channel extension types, that is, channel bonding and channel aggregation, as an example. A wireless access point (AP) defined in the IEEE 802.11ay standard is used as an example of a base station, and a terminal device defined in the IEEE 802.11ay standard is used as an example of user equipment. In this standard, the terminal device is referred to as a station.

As shown in FIG. 1, in step 101, a terminal device sends capability information of the terminal device to a wireless access point. The capability information may be information about a maximum quantity of to-be-aggregated channels supported by the terminal device, information about one or more channel extension types supported by the terminal device, or information about a maximum bandwidth of a single channel supported by the terminal device. Alternatively, the capability information may include any combination of the foregoing information. The maximum quantity of to-be-aggregated channels supported by the terminal device is a quantity of radio frequency (RF) chains of the terminal device. The terminal device can send and receive data on multiple channels at the same time by using these radio frequency chains. The information about the one or more channel extension types supported by the terminal device indicates the one or more channel extension types that can be supported by the terminal device, such as channel aggregation and/or channel bonding. The maximum bandwidth of a single channel supported by the terminal device is a maximum bandwidth used for data transmission on a single channel or a single receive radio frequency channel.

Figure 2:
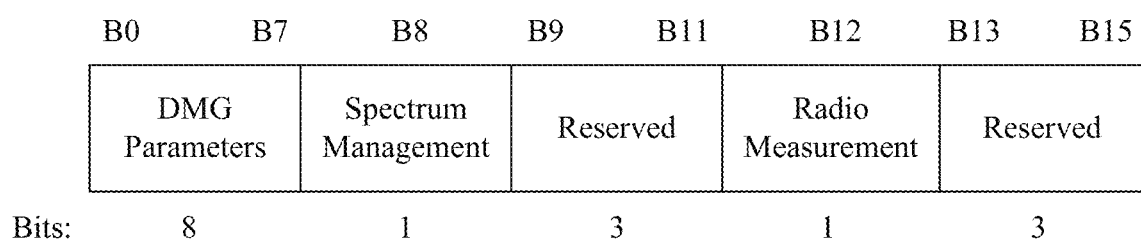
FIG. 2 is a schematic diagram of a format of a field used by a terminal device to feed back capability information according to an embodiment of the present invention.

The terminal device may transmit the capability information by using a message defined in a corresponding wireless communications system. In this embodiment, that a probe response frame or an association response frame defined in the IEEE 802.11ad is used to feed back the capability information of the terminal device is used as an example. In the IEEE 802.11ad standard, a field of the capability information defined in the probe response frame or the association response frame is shown in FIG. 2. A total of six bits, that is, B9 to B11 and B13 to B15, are reserved fields. In this embodiment, these reserved fields are used for transmitting the capability information of the terminal device.

Two of the six bits in the reserved field are used to indicate the maximum quantity of to-be-aggregated channels supported by the terminal device. For example, two bits B9 and B10, may be used to indicate the maximum quantity of to-be-aggregated channels supported by the terminal device. As shown in Table 1, two bits may support up to four different values of the maximum quantity of to-be-aggregated channels. For example, if a value of B9B10 is 10, it indicates that the terminal device can aggregate three channels for data transmission at the same time.

TABLE 1

| B9B10 | Maximum quantity of to-be-aggregated channels |
|---|---|
| 00 | 1 |
| 01 | 2 |
| 10 | 3 |
| 11 | 4 |

Two of the six bits in the reserved fields are used to indicate the maximum bandwidth of a single channel supported by the terminal device. For example, two bits B13 and B14 may be used to indicate the maximum bandwidth of a single channel supported by the terminal device. As shown in Table 2, two bits may support up to four different maximum bandwidth. For example, if a value of B13B14 is 10, it indicates that the terminal device can support a maximum of three channels; and if a channel bandwidth of 2.16 GHz defined in the IEEE 802.11ad is used as an example, a maximum bonded bandwidth supported after channel bonding is 6.48 GHz.

TABLE 2

| B13B14 | Maximum bandwidth |
|---|---|
| 00 | 2.16 GHz |
| 01 | 4.32 GHz |
| 10 | 6.48 GHz |
| 11 | 8.64 GHz |

Two of the six bits in the reserved fields are used to indicate the channel extension type supported by the terminal device. For example, two bits B11 and B15 may be used to indicate the channel extension type supported by the terminal device. For example, if a value of B11B15 is 00, it indicates that the terminal device supports only channel bonding; if a value of B11B15 is 01, it indicates that the terminal device supports only channel aggregation; if a value of B11B15 is 10, it indicates that the terminal device supports both channel bonding and channel aggregation; or if a value of B11B15 is 11, it indicates that the terminal device supports neither channel bonding nor channel aggregation.

The foregoing use of the reserved fields is merely an example. A person skilled in the art may use, according to a requirement, a bit in the reserved fields in different manners to feed back the capability information of the terminal device without creative efforts.

In step 102, the wireless access point determines one or more channel extension types for the terminal device according to the capability information of the terminal device, and allocates one or more channels to the terminal device for data transmission.

The wireless access point determines, according to the capability information that is of the terminal device and that is fed back by the terminal device, a channel extension type that is supported by the terminal device. For example, the wireless access point determines whether the terminal device supports channel bonding and/or channel aggregation.

The wireless access point obtains a maximum bonded bandwidth of the terminal device according to the capability information that is of the terminal device and that is fed back by the terminal device.

The wireless access point may determine a channel extension type for the terminal device according to whether the terminal device supports channel bonding and/or channel aggregation, and the maximum bonded bandwidth, and schedule the one or more channels used for data transmission. In addition, the wireless access point may schedule one or more channels for the terminal device by referring to a service requirement of the terminal device or a channel status of each channel.

In step 103, the wireless access point sends channel allocation information and/or channel extension type information to the terminal device. The channel allocation information indicates a specific channel or specific channels on which the terminal device sends and receives data. The channel extension type information indicates the one or more channel extension types of the specific channel or the specific channels allocated to the terminal device. That is, the channel extension type information indicates a specific channel extension type used by the terminal device for sending and receiving data.

In this embodiment, the wireless access point performs, according to a capability of the terminal device, data transmission in a corresponding channel extension type, so that multiple channel extension types can be flexibly used in the system, thereby improving system spectrum utilization and increase a system capacity.

Figure 3A:
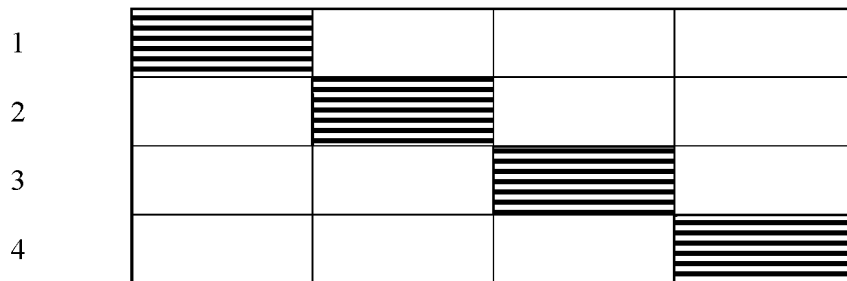
FIG. 3a is a schematic diagram of a channel allocation combination manner according to an embodiment of the present invention.
Figure 3A:
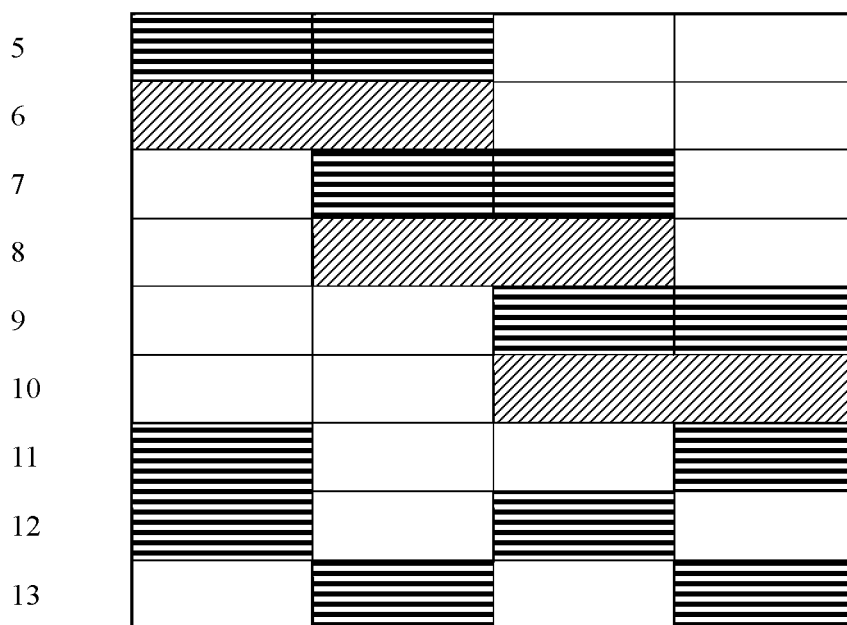
Figure 3A:
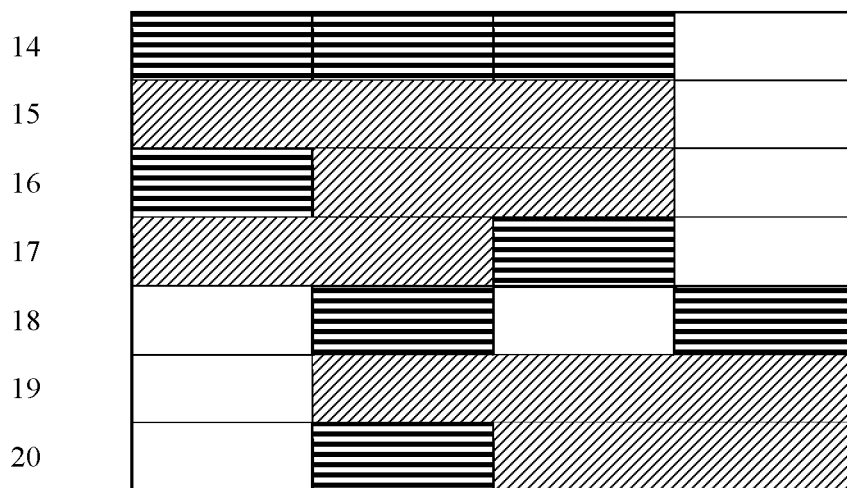
Figure 3A:
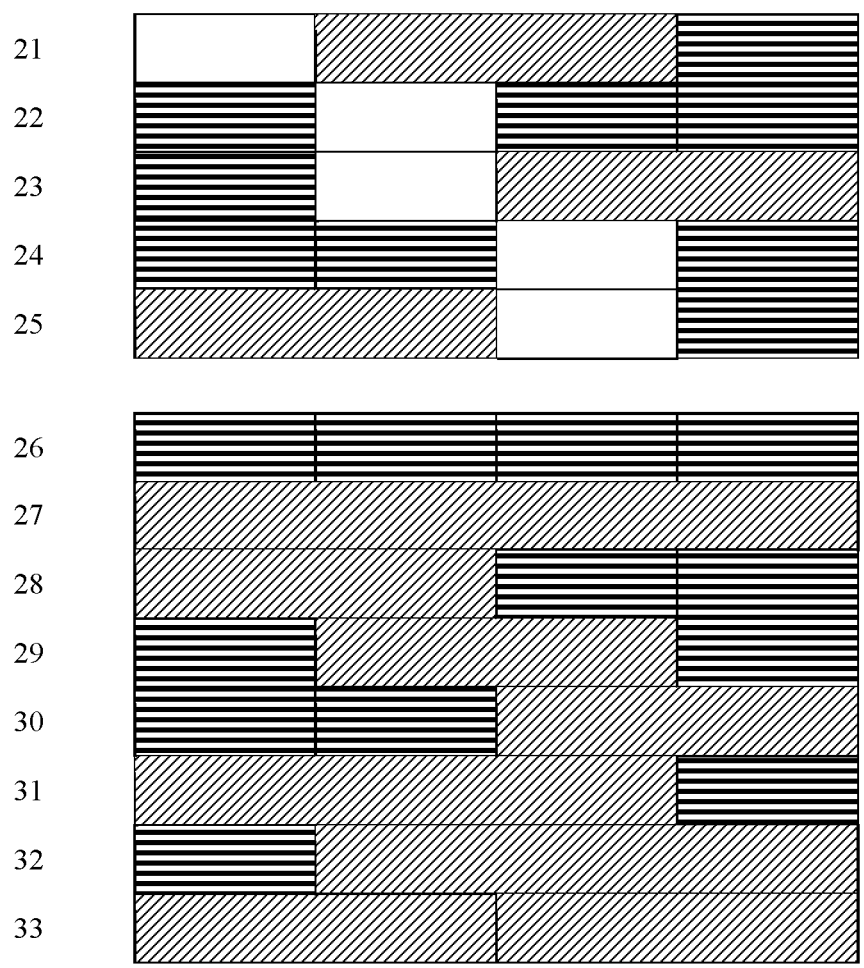

In an embodiment of the present invention, it is assumed that four channels are available in a system: a channel 1 (CH1), a channel 2 (CH2), a channel 3 (CH3), and a channel 4 (CH4). FIG. 3a shows all possible channel allocation combinations and possible channel extension type combinations. As shown in the figure, there are totally 33 combinations. In combinations 1 to 4, only one channel is allocated; in combinations 5 to 13, two channels are allocated, where in combinations 6, 8, and 10, the two allocated channels are bonded for transmission. In combinations 14 to 25, three channels are allocated, where in combinations 15 to 19, the three allocated channels are bonded for transmission; and in combinations 16, 17, 20, 21, 23, and 25, two contiguous channels in the three allocated channels are bonded for transmission. In combinations 26 to 33, four channels are allocated, where in combination 27, the four allocated channels are bonded for transmission; in combinations 31 and 32, three contiguous channels in the four allocated channels are bonded for transmission; in combinations 28, 29, and 30, one pair of contiguous channels in the four allocated channels is bonded for transmission; and in combination 33, two pairs of contiguous channels in the four allocated channels are separately bonded for transmission. The foregoing 33 combinations of channel allocation and channel extension type combinations may be encoded in six bits.

Figure 3B:
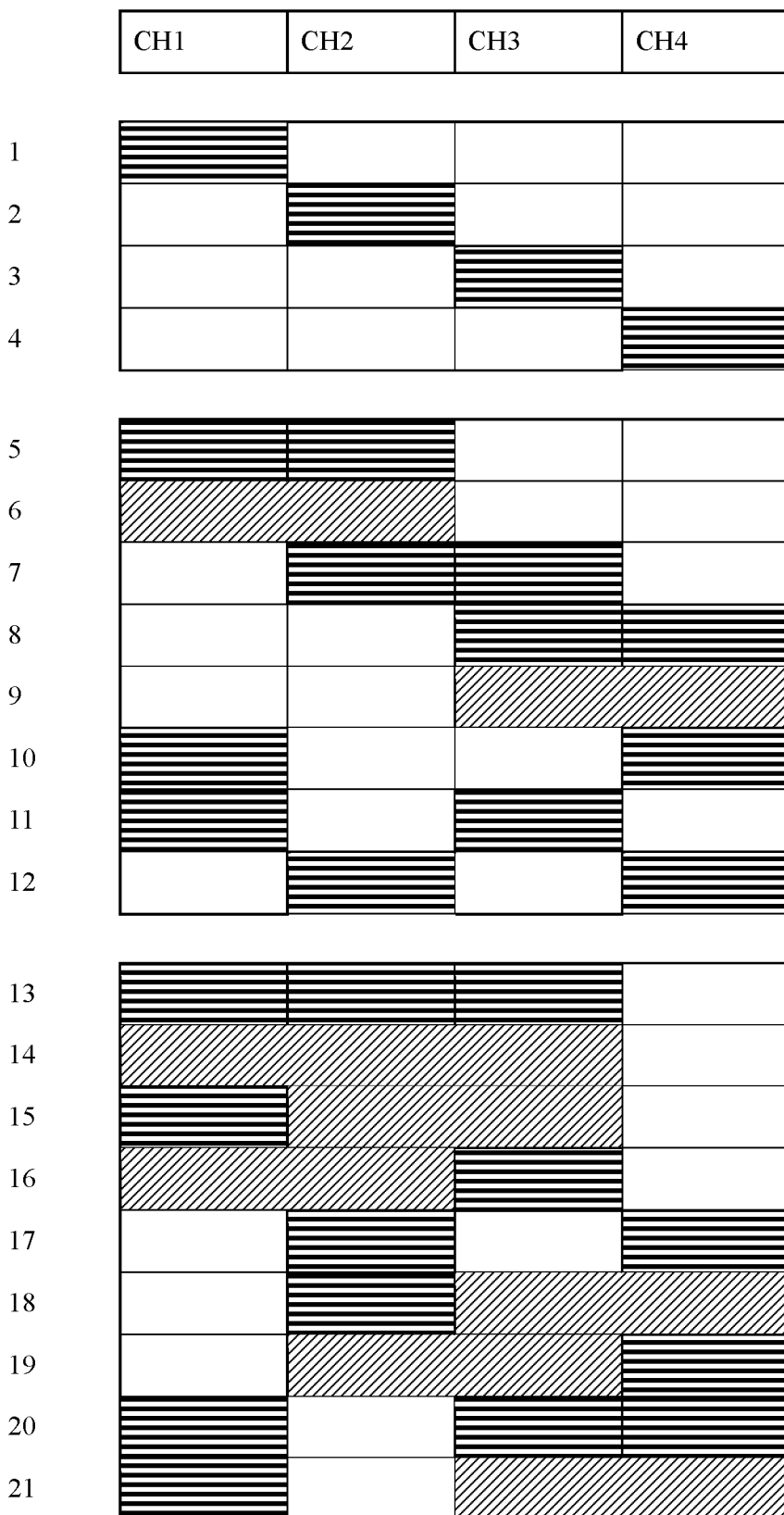
FIG. 3b is a schematic diagram of a second channel allocation combination manner according to an embodiment of the present invention.
Figure 3B:
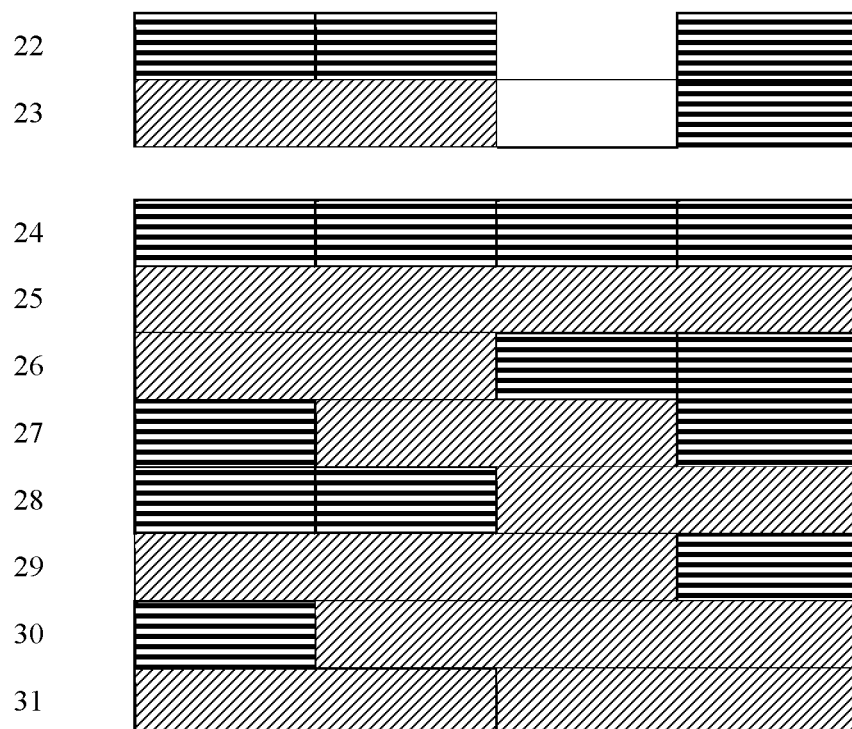
Figure 4A:
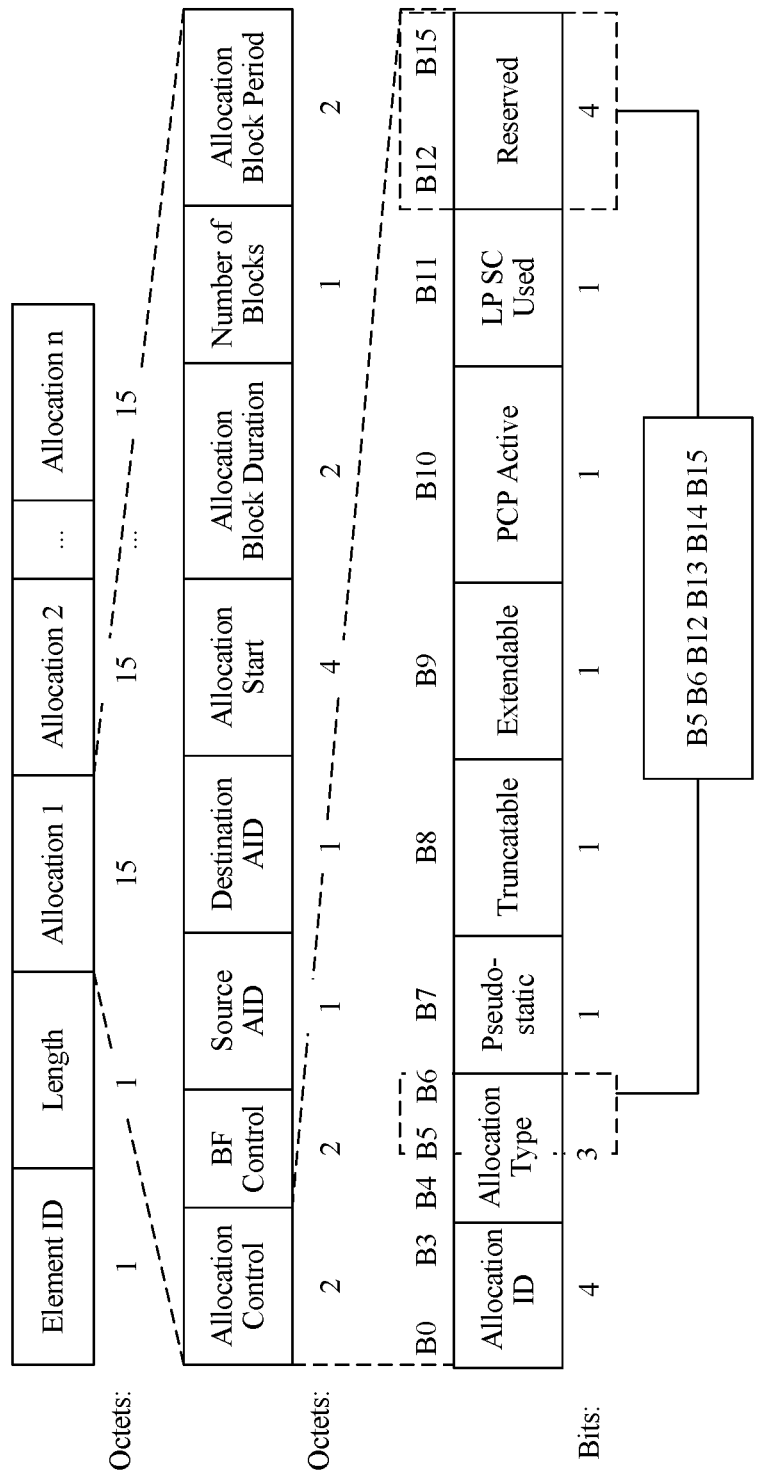
FIG. 4a is a schematic diagram of a format of an extended schedule element according to an embodiment of the present invention.

In another embodiment, to simplify a corresponding system design, all possible channel allocation combinations and possible channel extension type combinations may be screened to some extent based on a specific constraint condition. For example, if combinations 18 and 19 in FIG. 3a are not selected, a total of 31 combinations shown in FIG. 3b may be obtained. The 31 combinations of channel allocation and channel extension type combinations may be encoded in five bits. In this embodiment, a wireless access point may use an extended schedule element (Extended Schedule Element) field included in a beacon (Beacon) frame or an announce (Announce) frame periodically sent in an IEEE 802.11ad system to send the channel allocation information and/or the channel extension type information to a terminal device. FIG. 4a shows a case in which an extended schedule element defined in the IEEE 802.11ad system is used to send channel allocation information and/or channel extension type information according to this embodiment. As shown in FIG. 4a, the extended schedule element includes: one element ID field whose length is 1 byte, where 1 byte includes eight bits; one length indication field whose length is 1 byte; and n allocation fields whose lengths are 15 bytes. A resource allocation 1 field is used to indicate a first section of resources allocated to the terminal device. A resource allocation 2 field is used to indicate a second section of resources allocated to the terminal device. By analogy, a resource allocation n field is used to indicate an $n^{th}$ section of resources allocated to the terminal device. Each resource allocation field includes one allocation control field whose length is 2 bytes. Four bits (B12, B13, B14, and B15) in the foregoing allocation control field are reserved bits in the IEEE 802.11ad standard. In addition, one 3-bit allocation type field is defined in the foregoing allocation control field. As shown in Table 3, two combinations of the three bits are respectively defined as two different allocation types, and one of the three bits is actually used, that is, B4 in Table 3.

TABLE 3

| B4 | B5 | B6 | Meaning |
|---|---|---|---|
| 0 | 0 | 0 | Scheduled service period (Scheduled service Period, SP) allocation |
| 1 | 0 | 0 | Contention-based access period (Contention-Based Access Period, CBAP) allocation |
| Another combination | | | Reserved (Reserved) |

Therefore, two bits in the allocation type field may be reserved, and constitute sixth bits with the four reserved bits in the allocation control field that is used to transmit the channel allocation information and/or the channel extension type information. As shown in FIG. 4a, B5, B6, B12, B13, B14, and B15 in the allocation control field form a 6-bit field that may be used to transmit the 33 combinations of channel allocation information and channel extension type information shown in FIG. 3a.

The allocation type field in this embodiment may be re-defined, as shown in Table 4.

TABLE 4

| B4 | B5 | B6 | Meaning |
|---|---|---|---|
| 0 | 0 | 0 | SP allocation (used in the IEEE 802.11ad and the IEEE 802.11ay) |
| 0 | 0 | 1 | SP allocation (used only in the IEEE 802.11ay) |
| 0 | 1 | 0 | SP allocation (used only in the IEEE 802.11ay) |
| 1 | 0 | 0 | CBAP allocation (used in the IEEE 802.11ad and the IEEE 802.11ay) |

TABLE 4-continued

| B4 | B5 | B6 | Meaning |
|---|---|---|---|
| 1 | 0 | 1 | CBAP allocation (used only in the IEEE 802.11ay) |
| 1 | 1 | 0 | CBAP allocation (used only in the IEEE 802.11ay) |
| Another combination | | | Reserved |

000 and 100 are values defined in the IEEE 802.11ad, are used by a terminal device that is compatible with the IEEE 802.11ad, and are used by a terminal device in the IEEE 802.11ay. 001, 010, 101, and 110 are newly defined values in the present invention, and are used only by the terminal device in the IEEE 802.11ay. After detecting a value of the allocation field is 000 or 100, the terminal device in the IEEE 802.11ad interprets a subsequent field according to a definition in the IEEE 802.11ad, that is, the last four bits are considered as reserved bits. The terminal device in the IEEE 802.11ay detects the first bit in the allocation type field, that is, B4, so as to determine whether an allocation type is the SP or the CBAP; combines the last two bits in the allocation type field and the four bits in the reserved field to form a 6-bit field that is used to indicate the channel allocation information and the channel extension type information.

Figure 4B:
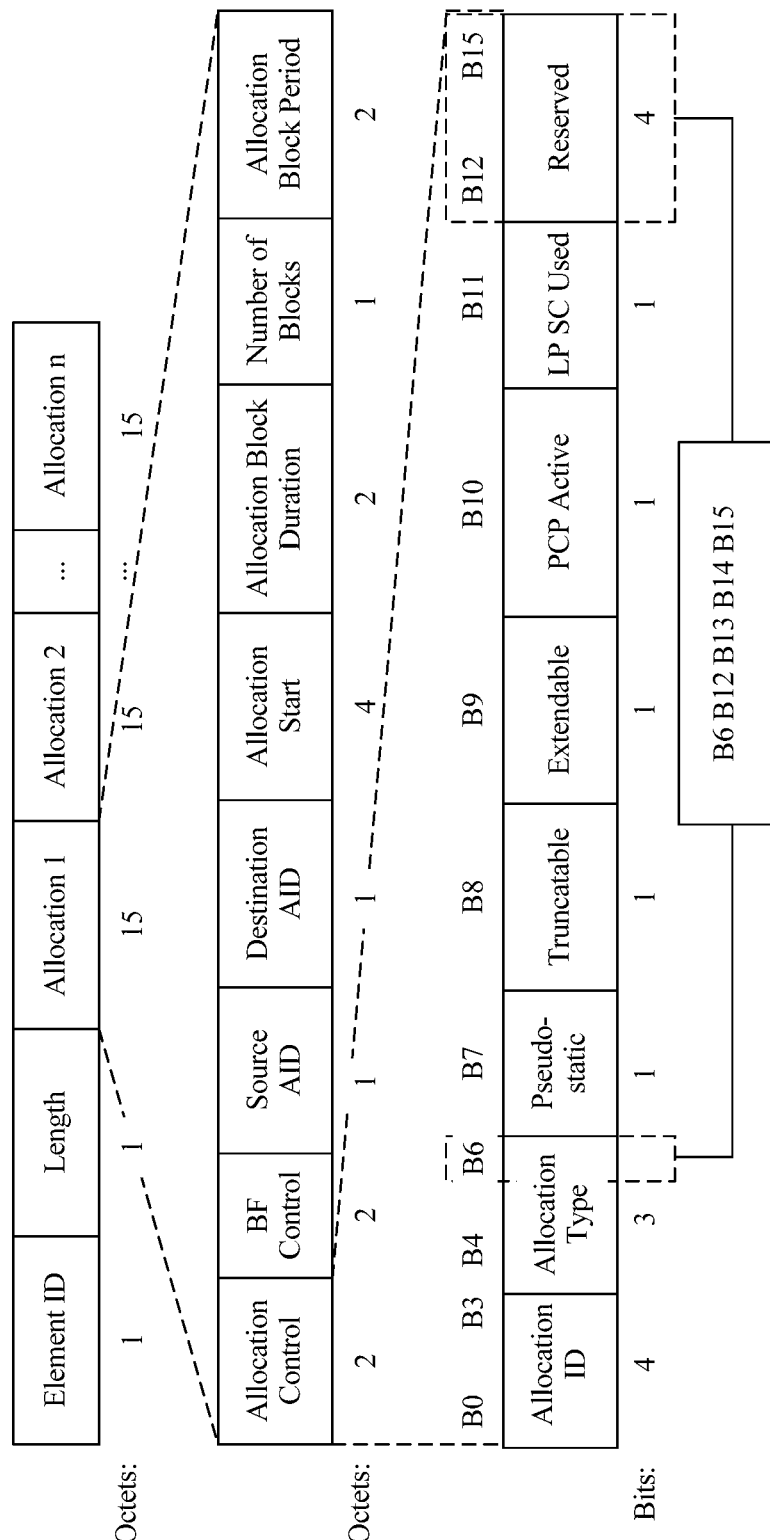
FIG. 4b is a schematic diagram of a second format of an extended schedule element according to an embodiment of the present invention.

In another implementation, one bit in the allocation type field may be reserved, and constitutes five bits with the four reserved bits in the allocation control field that is used to transmit the channel allocation information and the channel extension type information. The five bits may be used to transmit the 31 combinations of channel allocation information and channel extension type information shown in FIG. 3b. As shown in FIG. 4b, B6, B12, B13, B14, and B15 in the allocation control field form a 5-bit field. In addition, as shown in FIG. 5a, the allocation control field may be re-defined to form a new 6-bit field that is used to indicate the channel allocation information and the channel extension type information. A difference between formats of the allocation control field and the allocation control field in the extended schedule element shown in FIG. 4a lies in that an allocation type field is shortened from the originally three bits to one bit, subsequent fields are correspondingly shifted, and the last six bits form a new field, that is, a channel allocation (Channel Allocation) field that is used to indicate the channel allocation information and the channel extension type information.

Certainly, if only five bits are needed for transmitting the channel allocation information and the channel extension type information, the allocation control field may also be re-defined to form a 5-bit new field, as shown in FIG. 5b. A difference between formats of the allocation control field and the allocation control field in the extended schedule element shown in FIG. 4b lies in that an allocation type field is shortened from the originally three bits to two bits, subsequent fields are correspondingly shifted, and the last five bits form a new field, that is, a channel allocation (Channel Allocation) field that is used to indicate the channel allocation information and the channel extension type information.

Figure 6:
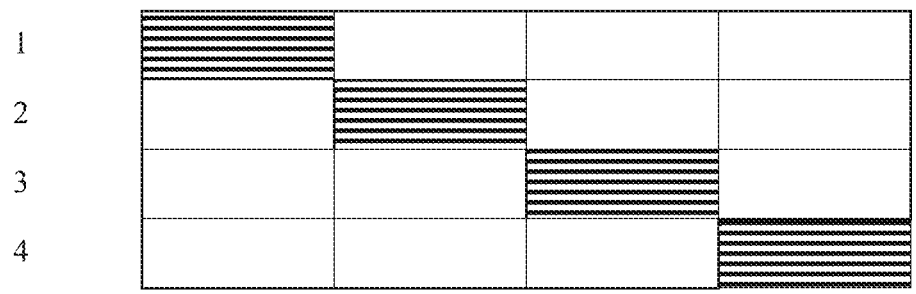
FIG. 6 is a schematic diagram of a third channel allocation combination manner according to an embodiment of the present invention.
Figure 6:
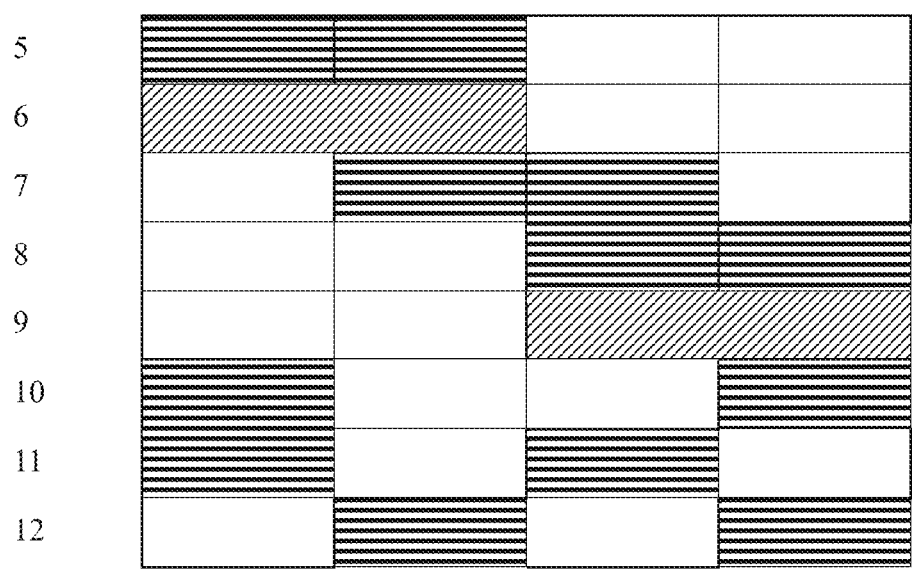
Figure 6:
Figure 6:

In another embodiment, to simplify a corresponding system design, all possible channel allocation combinations and possible channel extension type combinations may be screened to some extent based on a specific constraint condition. For example, it is assumed that four channels are available in the system, and channel aggregation can be performed on a maximum of two channels. In this case, a total of 14 channel allocation combinations may be obtained, as shown in FIG. 6. The 14 channel allocation combinations may be encoded in four bits. As shown in FIG. 7a, the four reserved bits B12, B13, B14, and B15 in the allocation control field in the extended schedule element may be used to transmit the foregoing 4-bit information used to indicate the channel allocation information and the channel extension type information.

As another example, the four reserved bits in the allocation control field in the extended schedule element are used to separately indicate the channel allocation information and the channel extension type information. For example, three bits in the reserved field, for example, the first three bits, that is, a channel allocation field in FIG. 7b, may be used to indicate the channel allocation information. One bit in the reserved field, for example, the last bit, that is, an extension type field in FIG. 7b, may be used to indicate the channel extension type information.

Figure 8A:
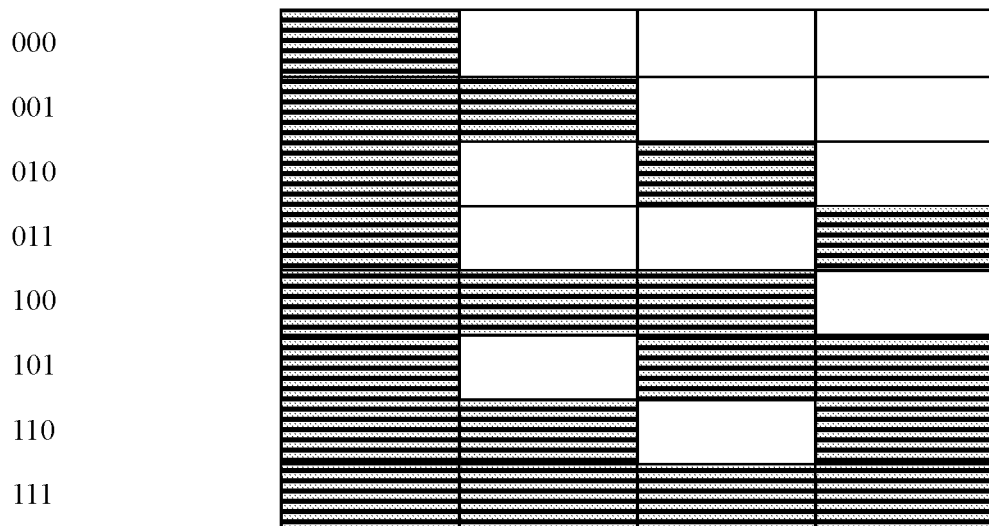
FIG. 8a is a schematic diagram of channel allocation information according to an embodiment of the present invention.
Figure 8B:
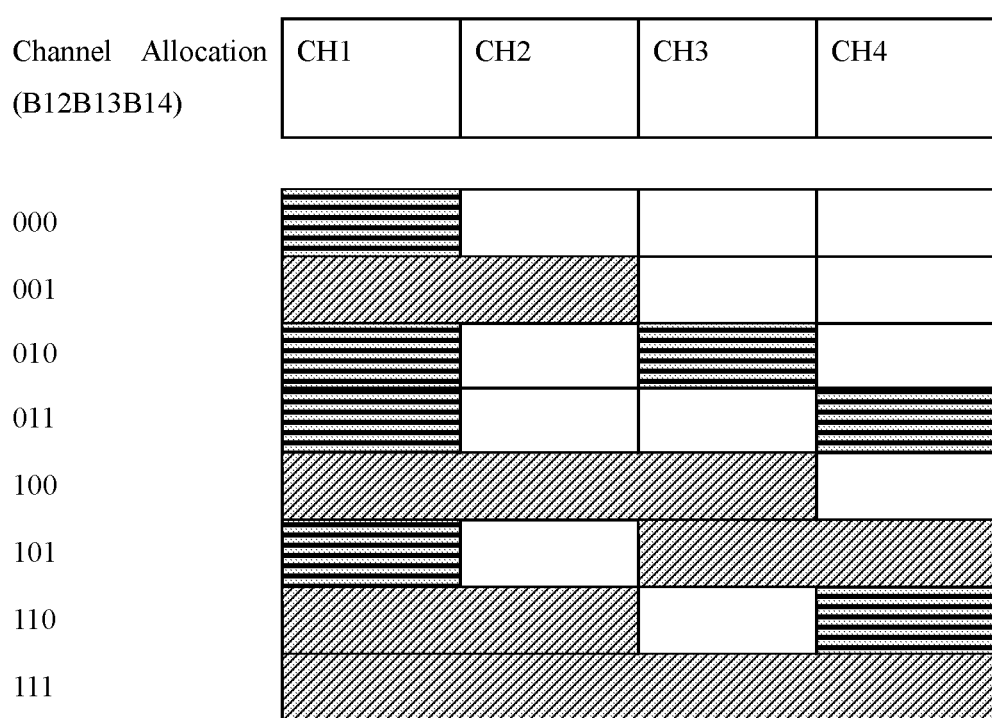
FIG. 8b is a schematic diagram of another type of channel allocation information according to an embodiment of the present invention.

FIG. 8a and FIG. 8b provide specific application examples of a channel allocation field and an extension type field. B12, B13, and B14 indicate channels allocated to a terminal device, and B15 indicates whether channel bonding is performed on multiple allocated adjacent channels. As shown in the figure, when B12B13B14 is 001, it indicates that both a channel 1 (CH1) and a channel 2 (CH2) are allocated to the terminal device; or when B12B13B14 is 101, it indicates that a channel 1 (CH1), a channel 3 (CH3), and a channel 4 (CH4) are all allocated to the terminal device. As shown in FIG. 8a, when a value of B15 is 0, a channel bonding technology is not used. As shown in FIG. 8b, when a value of B15 is 1, a channel bonding technology is used. For example, when B12B13B14 is 001, and B15 is 1, it indicates that both a channel 1 (CH1) and a channel 2 (CH2) are allocated to the terminal device, and channel extension is performed on the adjacent channel 1 (CH1) and channel 2 (CH2) in a channel bonding manner. Alternatively, when B12B13B14 is 101, and B15 is 1, it indicates that a channel 1 (CH1), a channel 3 (CH3), and a channel 4 (CH4) are all allocated to the terminal device, and channel extension is performed on the adjacent channel 3 (CH3) and channel 4 (CH4) in a channel bonding manner.

In the foregoing examples, an existing extended schedule element field format is used for transmitting the channel allocation information and/or the channel extension type information. In this embodiment of the present invention, alternatively, the channel allocation information and/or the channel extension type information may be transmitted by defining a new field, and this field is carried in a frame or a field used by the wireless access point to notify the terminal device of resource allocation. For example, a new extended schedule element is defined for multi-channel extension transmission of a terminal user.

For example, a 4-bit channel allocation field is defined, and channel allocation information is transmitted by means of bit mapping. A specific correspondence between values of the bits and allocated channels is shown in Table 5. A k$^{th}$ bit, that is, Bk, indicates an allocation status of a channel k, where a value of 0 indicates that the channel k is not allocated, and a value of 1 indicates that the channel k is allocated. For example, if B0B1B2B3 is 0101, it indicates that the second and fourth channels are allocated, that is, a CH2 and a CH4 are allocated.

TABLE 5

| B0B1B2B3 | Channel allocation status |
| --- | --- |
| 0000 | Reserved (Reserved) |
| 0001 | CH4 |

TABLE 5-continued

| B0B1B2B3 | Channel allocation status |
| --- | --- |
| 0010 | CH3 |
| 0011 | CH3, CH4 |
| 0100 | CH2 |
| 0101 | CH2, CH4 |
| 0110 | CH2, CH3 |
| 0111 | CH2, CH3, CH4 |
| 1000 | CH1 |
| 1001 | CH1, CH4 |
| 1010 | CH1, CH3 |
| 1011 | CH1, CH3, CH4 |
| 1100 | CH1, CH2 |
| 1101 | CH1, CH2, CH4 |
| 1110 | CH1, CH2, CH3 |
| 1111 | CH1, CH2, CH3, CH4 |

In addition, a 1-bit channel extension type field may be defined to indicate whether channel bonding is performed on multiple allocated adjacent channels. If the channel extension type field is 0, a channel aggregation technology is used to perform channel extension by default; or if the channel extension type field is 1, a channel bonding technology is used to perform channel extension. For example, if the channel allocation field is 1101, and the channel extension type field is 1, the adjacent channel 1 and channel 2 form a channel with a large bandwidth by using a channel bonding technology, and then channel aggregation is performed on the channel and the channel 4 for data transmission.

As another example, alternatively, a 3-bit channel extension type field may be defined to indicate whether channel bonding is performed on multiple allocated adjacent channels. As shown in Table 6, if the field is 111, it indicates that a channel aggregation technology is used for the allocated channels for data transmission. 000 to 110 indicate bonding statuses of corresponding adjacent channels. If the wireless access point allocates four channels to the terminal device, that is, the channel allocation field is 1111, the wireless access point flexibly configures the channel extension type according to a maximum bonded bandwidth and a limit on a maximum quantity of to-be-aggregated channels supported by the terminal device, and notifies the terminal device by using a channel extension type field. For example, if the maximum quantity of to-be-aggregated channels of the terminal device is limited to 2, three channel extension types are available for selection: 011, 100, and 101. The wireless access point selects one of the three manners, and notifies the terminal device.

TABLE 6

| B0B1B2 | Channel extension type |
| --- | --- |
| 000 | CH1 and CH2 are bonded. |
| 001 | CH2 and CH3 are bonded. |
| 010 | CH3 and CH4 are bonded. |
| 011 | CH1 and CH2 are bonded, and CH3 and CH4 are bonded. |
| 100 | CH1, CH2, and CH3 are bonded. |
| 101 | CH2, CH3, and CH4 are bonded. |
| 110 | CH1, CH2, CH3, and CH4 are bonded. |
| 111 | Channel aggregation |

In another embodiment of the present invention, based on an existing extended schedule element, a new extended schedule element is defined for multi-channel extension transmission of a terminal device. Channel allocation information in the new extended schedule element is a supplement to the allocation information in the existing extended schedule element.

Figure 9A:
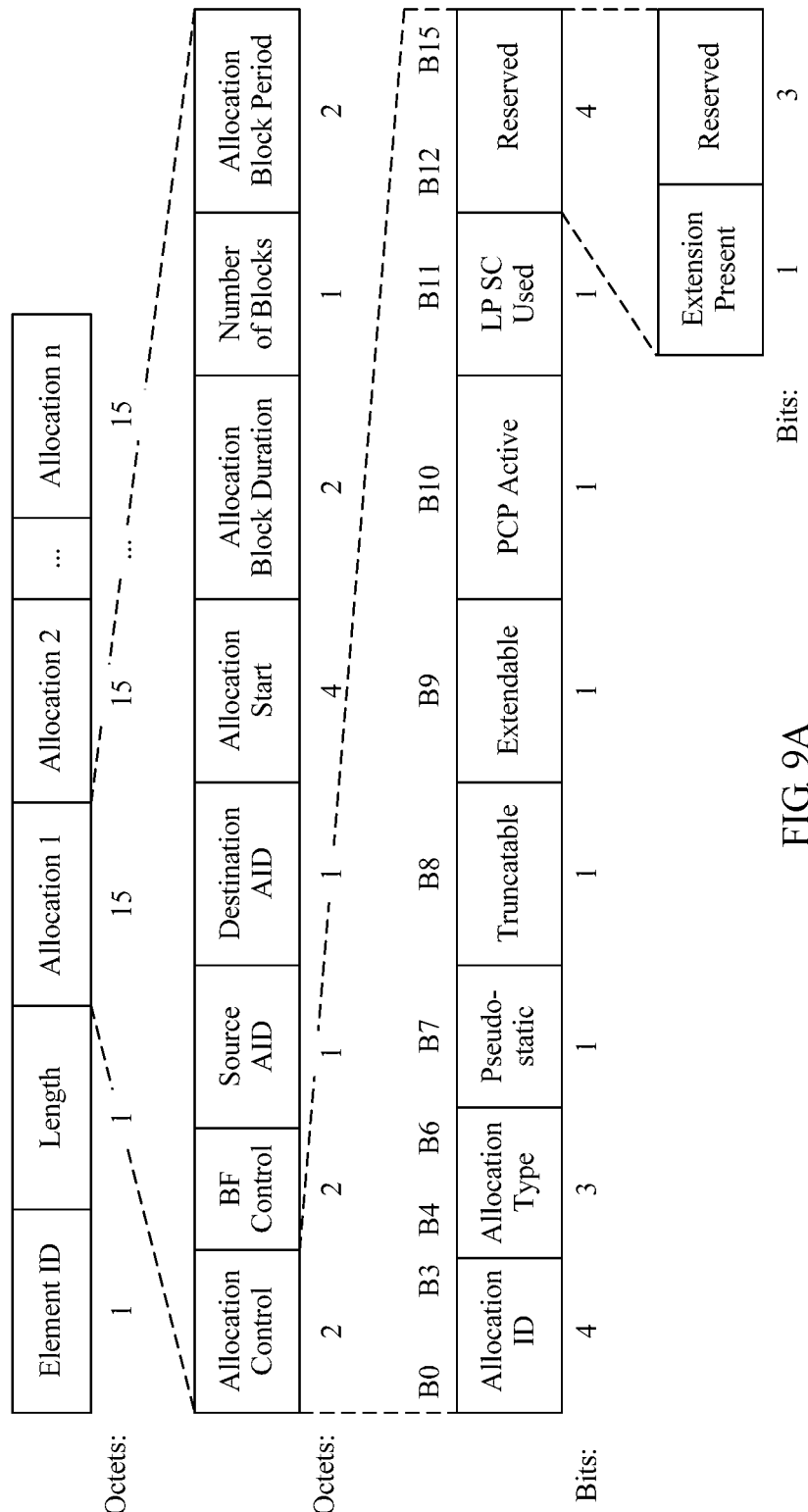
FIG. 9a is a schematic diagram of a fifth format of an extended schedule element according to an embodiment of the present invention.

In a method shown in FIG. 9a, an extension present field is introduced to the existing extended schedule element, and is used to indicate whether a terminal device needs to further detect a new extended schedule element to obtain supplementary allocation information. For example, a length of the extension present field is defined to be 1 bit. When a value of the field is 0, it indicates that a wireless access point allocates one channel to the terminal device, and the channel and a channel used for transmitting a current extended schedule element are a same channel; and this indicates that the terminal device does not need to further detect a new extended schedule element. When a value of the field is 1, it indicates that a wireless access point allocates multiple channels to the terminal device for transmission, or the wireless access point allocates one channel to the terminal device, but the channel and a channel used for transmitting a current extended schedule element are different channels; and this indicates that the terminal device needs to detect a new extended schedule element to obtain supplementary allocation information. As shown in FIG. 9a, one bit in the 4-bit reserved field in the original extended schedule element may be used as the extension present field.

Figure 9B:
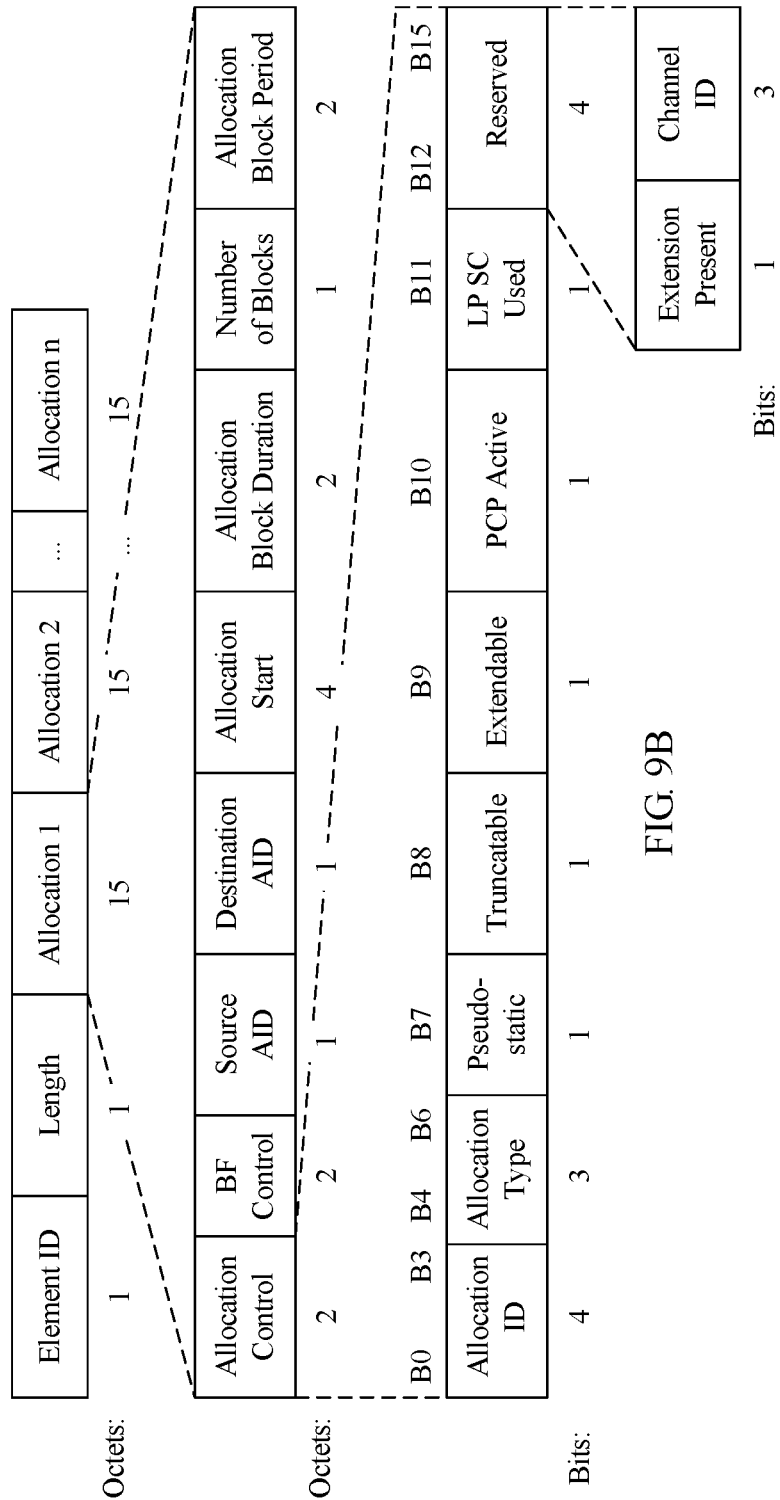
FIG. 9b is another schematic diagram of the fifth format of an extended schedule element according to an embodiment of the present invention.

In another method shown in FIG. 9b, an extension present field is introduced to the existing extended schedule element, and is used to indicate whether a terminal device needs to further detect a new extended schedule element to obtain supplementary allocation information. In addition, a channel ID field is introduced, and is used to indicate a channel ID of a channel that is allocated to the terminal device by a wireless access point. When a value of the extension present field is 0, it indicates that the wireless access point allocates one channel to the terminal device; the channel is indicated by a channel ID field; and the terminal device does not need to further detect a new extended schedule element. When a value of the extension present field is 1, it indicates that a the wireless access point allocates multiple channels to the terminal device for transmission, and this indicates that the terminal device needs to detect a new extended schedule element to obtain supplementary allocation information. As shown in FIG. 9b, one bit in the 4-bit reserved field in the existing extended schedule element may be used as the extension present field, and the remaining three bits are used as a channel ID field.

Figure 10:
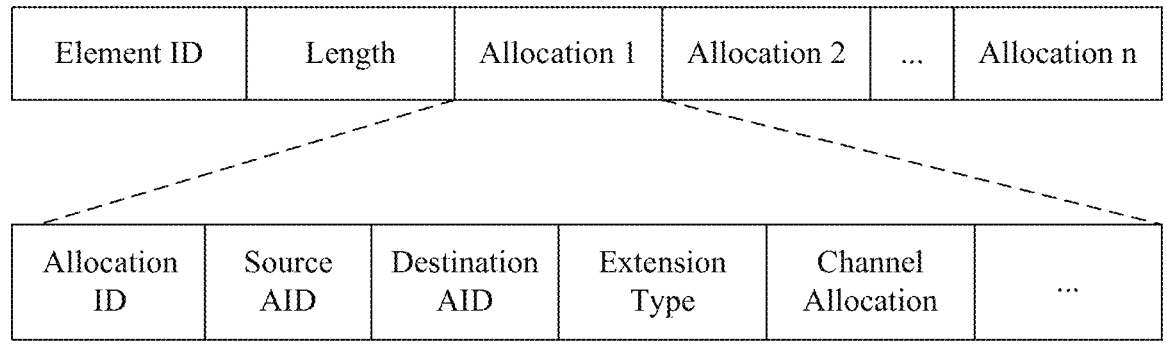
FIG. 10 is a schematic diagram of a sixth format of an extended schedule element according to an embodiment of the present invention.

As shown in FIG. 10, a new extended schedule element includes an element ID field. An element ID number carried in the element ID field is different from an element ID number carried in the existing extended schedule element, and is used to identify whether the extended schedule element is a new extended schedule element or the existing extended schedule element. The new extended schedule element further includes a length field and multiple allocation fields. The allocation field includes an allocation ID, a source association ID (Source AID), a destination association ID (Destination AID), and an extension type field, and channel allocation fields. Definitions of the allocation ID, the source association ID, and the destination association ID that are in the allocation field in the new extended schedule element are consistent with definitions of the allocation ID, the source association ID, and the destination association ID that are in an allocation field in the existing extended schedule element. In the new extended schedule element, the allocation ID, the source association ID, and the destination association ID jointly determine one allocation in the new extended schedule element. If the allocation field in the existing extended schedule element and the allocation field in the new extended schedule element indicate a same allocation, the allocation ID, the source association ID, and the destination association ID that are in the allocation field in the existing extended schedule element are consistent with the allocation ID, the source association ID, and the destination association ID that are in the allocation field in the new extended schedule element.

The extension type field indicates a channel extension type. The channel allocation field indicates a channel allocation status, that is, information about the multiple channels. For example, a length of the extension type field may be defined to be 1 bit, and a length of the channel allocation field may be defined to be 8 bits. If the extension type field is 0, it indicates that multi-channel extension is performed on adjacent channels by using a channel bonding technology, or only one channel is allocated; or if the extension type field is 1, it indicates that multi-channel extension is performed on adjacent channels by using a channel aggregation technology. For the 8-bit channel allocation field, channel allocation information is transmitted by means of bit mapping, and allocation of a maximum of eight channels is supported. Bits 0 to 7 (B0-B7) are respectively corresponding to channels 1 to 8 (CH1-CH8). A $k^{th}$ bit, that is, Bk, indicates an allocation status of a corresponding channel, where a value of 0 indicates that the channel is not allocated, and a value of 1 indicates that the channel is allocated. It is assumed that a system can allocate a maximum of six channels. The first six bits are valid bits, the last two bits are reserved bits, and values of the reserved bits may be set to 0. It is assumed that a maximum quantity of to-be-aggregated channels is 2, and a bandwidth of a single channel on which channel aggregation is performed is the same as or two times a bandwidth of a fundamental channel. In this case, a channel allocation status table shown in Table 7 may be obtained.

TABLE 7

| B0B1B2B3B4B5B6B7 | Channel allocation status |
| --- | --- |
| 00000000 | Reserved (Reserved) |
| 10000000 | CH1 |
| 01000000 | CH2 |
| 00100000 | CH3 |
| 00010000 | CH4 |
| 00001000 | CH5 |
| 00000100 | CH6 |
| 11000000 | CH1, CH2 |
| 01100000 | CH2, CH3 |
| 00110000 | CH3, CH4 |
| 00011000 | CH4, CH5 |
| 00001100 | CH5, CH6 |
| 10100000 | CH1, CH3 |
| 10010000 | CH1, CH4 |
| 10001000 | CH1, CH5 |
| 10000100 | CH1, CH6 |
| 01010000 | CH2, CH4 |
| 01001000 | CH2, CH5 |
| 01000100 | CH2, CH6 |
| 00101000 | CH3, CH5 |
| 00100100 | CH3, CH6 |
| 00010100 | CH4, CH6 |
| 11100000 | CH1, CH2, CH3 |
| 01110000 | CH2, CH3, CH4 |
| 00111000 | CH3, CH4, CH5 |
| 00011100 | CH4, CH5, CH6 |
| 11110000 | CH1, CH2, CH3, CH4 |
| 01111000 | CH2, CH3, CH4, CH5 |
| 00111100 | CH3, CH4, CH5, CH6 |
| 11011000 | CH1, CH2, CH4, CH5 |
| 11001100 | CH1, CH2, CH5, CH6 |
| 01101100 | CH2, CH3, CH5, CH6 |

For example, it is assumed that the channel allocation field is 11000000. When the extension type field is 0, channel extension is performed on adjacent channel 1 and channel 2 by using a channel bonding technology; or when the extension type field is 1, channel extension is performed on adjacent channel 1 and channel 2 by using a channel aggregation technology. For another example, it is assumed that the channel allocation field is 11110000. When the channel extension type field is 0, channel extension is performed on adjacent channel 1, channel 2, channel 3, and channel 4 by using a channel bonding technology; or when the channel extension type field is 1, channel bonding is performed on the channel 1 and the channel 2 to form a large bandwidth 1, channel bonding is performed on a channel 5 and a channel 6 to form another large bandwidth 2, and then channel aggregation is performed on the large bandwidth 1 and the large bandwidth 2 for channel extension.

When a wireless access point allocates multiple channels to a terminal device for transmission, the wireless access point sends, to the terminal device, an existing extended schedule element that is referred to as a first extended schedule element below. The first extended schedule element carries indication information that indicates that multiple channels are allocated to the terminal device. The indication information may be the extension present field mentioned above. The field includes one bit. When a value of the field is 1, it indicates that multiple channels are allocated to the terminal device.

The wireless access point further needs to send, to the terminal device, a new extended schedule element that is referred to as a second extended schedule element below. The second extended schedule element carries channel allocation information and/or channel extension type information. The channel allocation information indicates that the terminal device sends and receives data on multiple channels; and the channel extension type information indicates one or more channel extension types used by the wireless access point to allocate a channel to the terminal device. The channel allocation information may be carried in a channel allocation field in a resource allocation field of the second extended schedule element, and the channel extension type information may be carried in an extension type field in the resource allocation field.

The terminal device that performs multi-channel extension transmission needs to first obtain primary allocation information by using an allocation field in the existing extended schedule element, then obtain supplementary allocation information by using an allocation field in the new extended schedule element, and combine the obtained primary allocation information and supplementary allocation information to form complete allocation information of the multi-channel extension transmission.

In actual scheduled transmission, not all terminal devices having a multi-channel extension transmission capability are allocated multiple channels for data transmission. If the wireless access point allocates only one channel to a terminal device, the terminal device needs to obtain only the allocation information in the existing extended schedule element, and does not need to detect or obtain allocation information in a new extended schedule element. The foregoing has described in detail, with reference to FIG. 9a and FIG. 9b, information carried in an extended schedule element when only one channel is allocated, and details are not described herein again.

The terminal device may first obtain the information in the existing extended schedule element, that is, the first extended schedule element, and obtains, according to the source association ID or the destination association ID, an allocation field used to allocate a channel to the terminal device. If a value of an extension present field in the allocation field is 0, allocation information may be obtained by using the first extended schedule element. If a value of an extension present field is 1, the terminal device needs to obtain information in a new extended schedule element, that is, the second extended schedule element, and obtain a corresponding allocation field in the corresponding second extended schedule element according to the allocation ID, the source association ID, and the destination association ID carried in the first extended schedule element, so as to obtain complete allocation information.

The foregoing embodiment has described a process in which the wireless access point allocates a channel to the terminal device in a channel extension manner and notifies the terminal device. After receiving corresponding information, the terminal device may adjust a radio frequency chain parameter, and send and receive data on the allocated channel. The following embodiment describes how the terminal device feeds back acknowledgement (ACK) information after receiving data sent by the wireless access point.

Figure 11:
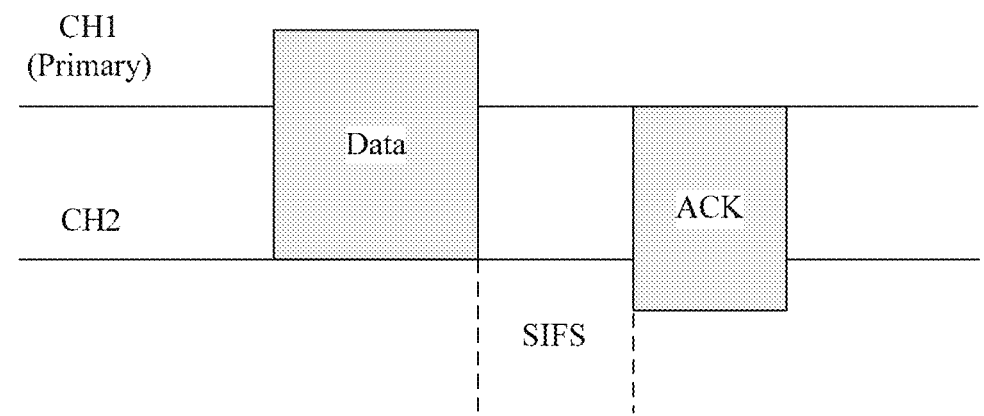
FIG. 11 is a schematic diagram of a manner of feeding back acknowledgement information during channel bonding according to an embodiment of the present invention.

In this embodiment, a wireless access point and a terminal device that are defined in the IEEE 802.11ay standard are still used as examples when a communications system supports two channel extension types (channel bonding and channel aggregation). After correctly receiving data sent by the wireless access point, the terminal device needs to send an acknowledgement frame after a short interframe space (SIFS), so as to feed back a data receiving success to the wireless access point. For data transmitted by using a channel bonding technology, an acknowledgement frame may be sent on a bonded channel. As shown in FIG. 11, when the wireless access point allocates channels CH1 and CH2 to the terminal device, where the CH1 is a primary channel; and sends data to the terminal device by bonding the channels CH1 and CH2, after correctly receiving the data, the terminal device may send an acknowledgement frame on the bonded channels CH1 and CH2.

Figure 12:
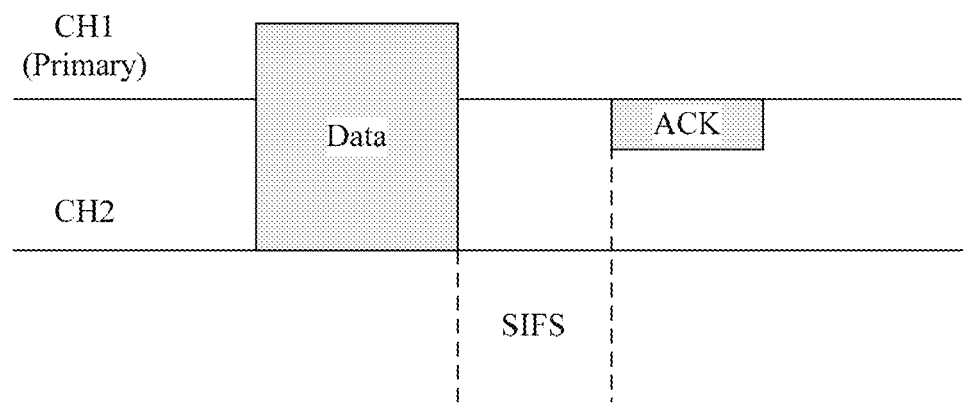
FIG. 12 is a schematic diagram of another manner of feeding back acknowledgement information during channel bonding according to an embodiment of the present invention.

In the foregoing embodiment, the problem about how to feed back acknowledgement information during channel bonding is resolved by feeding back an acknowledgement frame on the bonded channel. However, when the terminal device sends the acknowledgement frame on an entire bonded channel bandwidth, a transmit power of the acknowledgement frame is equally divided on a relatively large bandwidth. Consequently, a coverage area may be limited to some extent. In consideration of this, another embodiment of the present invention provides another manner of feeding back acknowledgement information, as shown in FIG. 12. In this embodiment, the wireless access point allocates channels CH1 and CH2 to the terminal device, where the CH1 is a primary channel; and sends data to the terminal device by bonding the channels CH1 and CH2. After correctly receiving the data, the terminal device sends an acknowledgement frame on the primary channel CH1. In this way, a transmit power of the acknowledgement frame can be concentrated on one channel, thereby ensuring a sending range of the acknowledgement frame, so that transmission reliability of the acknowledgement frame can be improved. Certainly, alternatively, the terminal device may select to transmit the acknowledgement frame on any one of bonded multiple channels in addition to the primary channel. No limitation is imposed herein.

Figure 13:
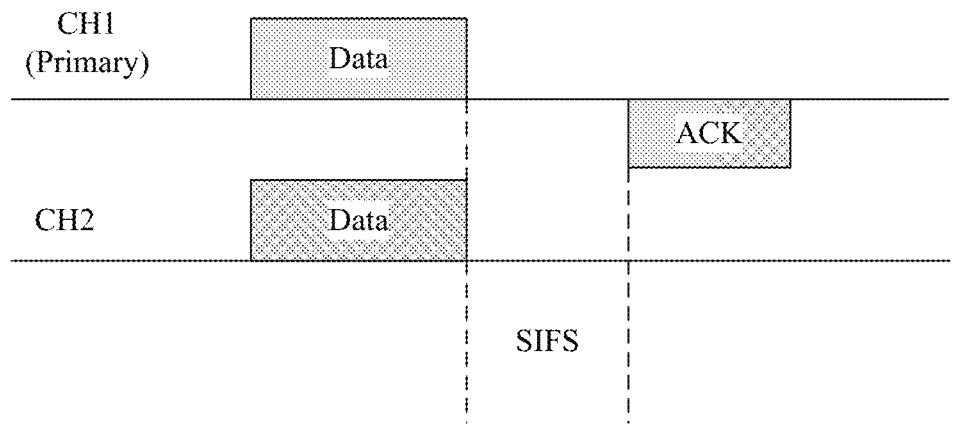
FIG. 13 is a schematic diagram of a manner of feeding back acknowledgement information during channel aggregation according to an embodiment of the present invention.
Figure 14:
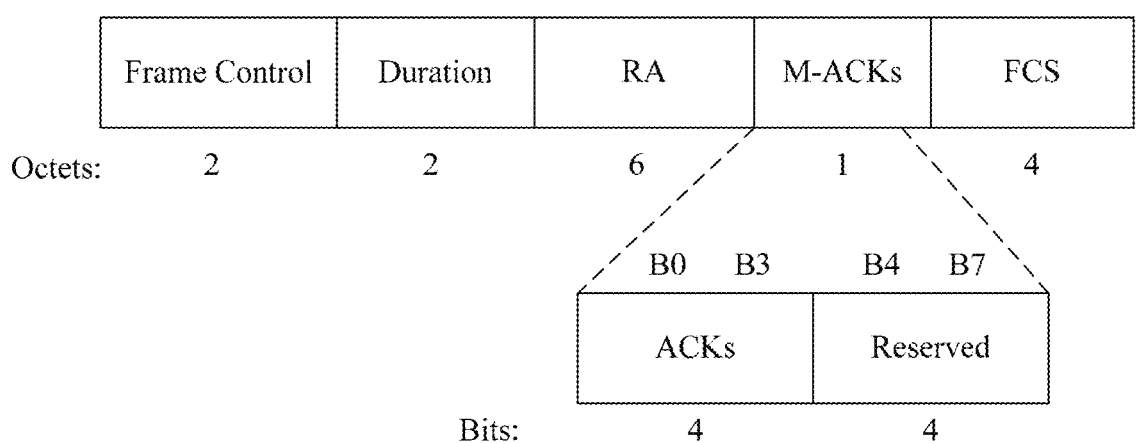
FIG. 14 is a schematic structural diagram of a multi-channel acknowledgement frame according to an embodiment of the present invention.

For data transmitted by using a channel aggregation technology, because different data streams are transmitted on different channels, and channel coding and data cyclic redundancy check that are of the different data streams are separately performed, an acknowledgement needs to be separately fed back for data transmitted on each channel. If an acknowledgement frame corresponding to data sent on each channel is separately transmitted on the channel, resource utilization of the acknowledgement frame is relatively low. An embodiment proposes a manner of feeding back acknowledgement information during channel aggregation, as shown in FIG. 13. In this embodiment, a wireless access point allocates channels CH1 and CH2 to a terminal device in a channel aggregation manner, where the CH1 is a primary channel. For data transmitted on the channels CH1 and CH2, the terminal device centrally feeds back acknowledgement information to the wireless access point on the primary channel CH1 by using one multi-channel acknowledgement frame. A structure of the multi-channel acknowledgement (ACK) frame is shown in FIG. 14. Based on a structure of a conventional acknowledgement frame, a multi-channel ACK field, that is, an M-ACKs field in FIG. 14, is introduced. This field is used to feed back ACK information of multiple channels. This field includes eight bits, where the first four bits are used for multi-channel ACK indication, and the remaining four bits are used as reserved bits. Data transmission acknowledgement information on multiple channels may be indicated by using the M-ACKs field. For example, acknowledgement information of data transmitted on the channel CH1 is fed back by using a bit B0, and acknowledgement information of data transmitted on the channel CH2 is fed back by using a bit B1. In this embodiment, data transmission acknowledgement information on multiple channels is centrally fed back by using one multi-channel acknowledgement frame, thereby improving utilization of the acknowledgement frame and feedback efficiency.

Figure 15:
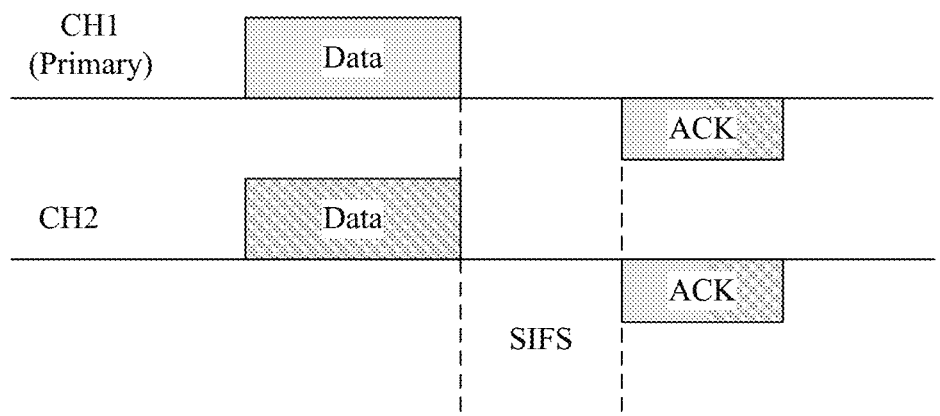
FIG. 15 is a schematic diagram of another manner of feeding back acknowledgement information during channel aggregation according to an embodiment of the present invention.

To obtain a diversity gain, and further enhance receiving reliability of the acknowledgement frame, another embodiment of the present invention provides a manner of feeding back acknowledgement information during channel aggregation, as shown in FIG. 15. In this embodiment, a wireless access point allocates channels CH1 and CH2 to a terminal device in a channel aggregation manner, where the CH1 is a primary channel. For data transmitted on the channels CH1 and CH2, acknowledgement information is centrally fed back by using one multi-channel acknowledgement frame. A structure of the multi-channel acknowledgement frame is shown in FIG. 14. The first four bits are used for multi-channel ACK indication. For example, acknowledgement information of data transmitted on the channel CH1 is fed back by using a bit B0, and acknowledgement information of data transmitted on the channel CH2 is fed back by using a bit B1. The terminal device sends the multi-channel acknowledgement frame on both the channels CH1 and CH2, so as to improve receiving reliability of the multi-channel acknowledgement frame.

When the wireless access point allocates a channel to the terminal device in both a channel bonding manner and a channel aggregation manner, in this embodiment of the present invention, the multi-channel acknowledgement frame shown in FIG. 14 may also be used to centrally feed back acknowledgement information. For example, the wireless access point allocates channels CH1, CH2, CH3, and CH4 to the terminal device. The CH1, the CH2, and the CH3 form a bonded channel in a channel bonding manner for data transmission, and the bonded channel and the channel CH4 transmit data in a channel aggregation manner. In this embodiment, the bit B0 in the multi-channel ACK field is used to indicate data acknowledgement information on the bonded channel, and B1 is used to indicate data acknowledgement information on the channel CH4. In this way, data acknowledgement information on all channels is fed back by using one multi-channel acknowledgement ACK frame, thereby improving feedback efficiency, and saving resources.

The foregoing embodiments of the present invention respectively describe the solutions such as the resource configuration method, the resource notification method, and the acknowledgement information feedback method. It may be understood that to implement the foregoing functions, the wireless access point and the terminal device include corresponding hardware structures and/or software structures for performing the functions. A person skilled in the art may be readily aware that, in combination with the examples described in the embodiments disclosed in this specification, units and algorithm steps may be implemented by hardware or a combination of hardware and computer software in the present invention. Whether a function is performed by hardware or by computer software by driving hardware depends on particular applications and design constraint conditions of the technical solutions. A person skilled in the art may use different methods to implement the described functions for each particular application, but it should not be considered that the implementation goes beyond the scope of the present invention.

Figure 16:
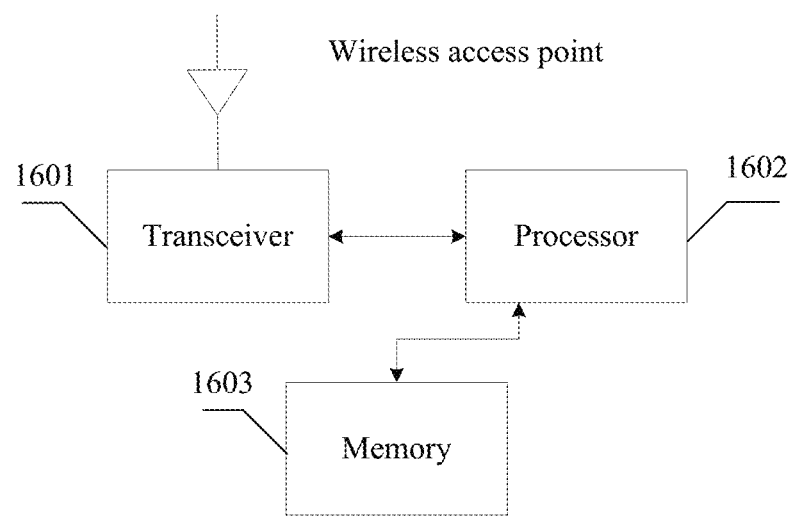
FIG. 16 is a schematic structural diagram of a wireless access point according to an embodiment of the present invention.

An embodiment provides a base station for implementing the foregoing resource allocation notification method. In this embodiment, a wireless access point defined in the IEEE 802.11ay standard is used as an example of the base station. FIG. 16 shows a possible structure of the wireless access point. As shown in the figure, the wireless access point includes a transceiver 1601 and a processor 1602. The transceiver 1601 may be configured to support information receiving or sending between the wireless access point and the terminal device in the foregoing embodiment. The processor 1602 may be configured to perform various functions used for communicating with the terminal device. In an uplink, an uplink signal from the terminal device is received by an antenna, and demodulated by the transceiver 1601. Further, the processor 1602 processes service data and signaling information sent by the terminal device. In a downlink, service data and a signaling message are processed by the processor 1602, modulated by the transceiver 1601 to generate a downlink signal, and transmitted to the terminal device by using an antenna. The processor 1602 is further configured to: execute the resource configuration and notification methods described in the foregoing embodiments, determine a channel extension type for the terminal device according to capability information of the terminal device, schedule a channel for the terminal device for data transmission, and send channel allocation information and/or channel extension type information to the terminal device. The foregoing embodiments have described in detail the manner of sending the channel allocation information and/or the channel extension type information and the format of a message/signaling that carries the channel allocation information and/or the channel extension type information, and details are not described herein again.

The wireless access point may further include a memory 1603 that may be configured to store program code and/or data. It may be understood that FIG. 16 shows only a simplified design of the wireless access point. In actual application, the wireless access point may include any quantity of transceivers, processors, memories, or the like, and all wireless access points that may implement the present invention fall within the protection scope of the present invention.

Figure 17:
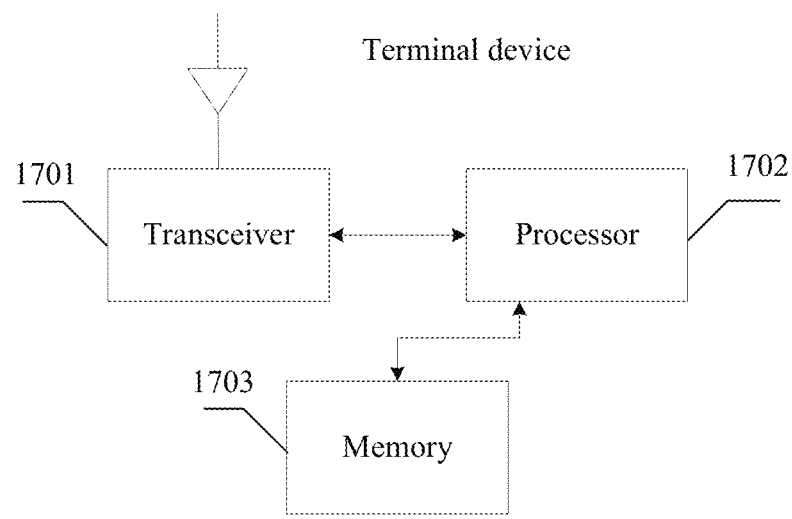
FIG. 17 is a schematic structural diagram of a terminal device according to an embodiment of the present invention.

FIG. 17 shows a simplified schematic diagram of a possible design structure of the terminal device provided in the foregoing embodiment. The terminal device includes a transceiver 1701 and a processor 1702, and may further include a memory 1703.

The transceiver 1701 transmits a signal to the wireless access point in the foregoing embodiment, and receives a downlink signal transmitted by the base station in the foregoing embodiment. For example, the transceiver 1701 may send capability information of the terminal device to the wireless access point, and may receive channel allocation information and/or channel extension type information sent by the wireless access point. After the terminal device receives data sent by the wireless access point, the transceiver 1701 may feed back acknowledgement (ACK) information to the wireless access point. For example, when the wireless access point allocates multiple channels to the terminal device in a channel bonding manner, after correctly receiving data, the transceiver 1701 sends ACK information to the wireless access point on a bonded channel or one of the multiple channels, where the bonded channel is formed by bonding the multiple channels; or when the wireless access point allocates multiple channels to the terminal device in a channel aggregation manner, after correctly receiving data, the transceiver 1701 sends multi-channel ACK information on one or more of the multiple channels, where the multi-channel ACK information indicates data acknowledgement information on each of the multiple channels; or when the wireless access point allocates multiple channels to the terminal device in both a channel bonding manner and a channel aggregation manner, after correctly receiving data, the transceiver 1701 sends multi-channel ACK information on one or more of the multiple channels, where the multi-channel ACK information indicates data acknowledgement information on a bonded channel and data acknowledgement information on another channel, and the multiple channels include the bonded channel and the another channel.

The processor 1702 controls and manages actions of the terminal device, so as to further process data and signaling information received by the transceiver 1701, obtain corresponding information, and perform processing performed by the terminal device in the foregoing embodiment. For example, the processor 1702 may generate the capability information of the terminal device, and send the capability information of the terminal device to the wireless access point by using the transceiver 1701, may parse and obtain the channel allocation information sent by the wireless access point, or may generate the acknowledgement (ACK) information or the multi-channel acknowledgement (ACK) information after the terminal device receives the data sent by the wireless access point, and send the acknowledgement (ACK) information or the multi-channel acknowledgement (ACK) information to the wireless access point by using the transceiver 1701. The foregoing embodiments have described the manners of sending the capability information of the terminal device, the ACK information, the multi-channel ACK information, the format of a message/signaling that carries the capability information of the terminal device, and the format of the multi-channel ACK information, and details are not described herein again. The terminal device may further include the memory 1703 that may be configured to store program code and/or data.

The processors of the wireless access point and the terminal device in the embodiments of the present invention may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The wireless access point and the terminal device may implement or execute various logic blocks, modules, and circuits that are used as examples and that are described with reference to disclosures in the embodiments of the present invention. Alternatively, the processor may be a combination for implementing a computing function, such as a combination including one or more microprocessors, or a combination of a DSP and a microprocessor.

The methods and algorithm steps described with reference to disclosures in the embodiments of the present invention may be implemented by hardware, or may be implemented by a processor by executing a software instruction. The software instruction may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any general or dedicated available medium accessible to a computer.

In the foregoing specific implementations, the objectives, technical solutions, and benefits of the present invention are further described in detail. It should be understood that the foregoing descriptions are merely specific implementations of the present invention, but are not intended to limit the protection scope of the present invention.

What is claimed is:

1. A resource allocation notification method, comprising:
receiving, by a wireless access point, capability information of a terminal device, wherein the capability information of the terminal device comprises one or more channel extension types supported by the terminal device;
determining, by the wireless access point according to the capability information of the terminal device, to allocate multiple channels to the terminal device; and
sending, by the wireless access point, channel allocation information and channel extension type information to the terminal device, wherein the channel allocation information indicates that the terminal device sends and receives data on the multiple channels, and the channel extension type information indicates the one or more channel extension types of the multiple channels that the wireless access point determines to use,
wherein the channel allocation information and the channel extension type information are carried in a new extended schedule element,
wherein the new extended schedule element includes an element ID field, a length field, and multiple allocation fields, one allocation field includes the channel allocation information and the channel extension type information, and an element ID number carried in the element ID field in the new extended schedule element is different from an element ID number carried in an existing extended schedule element, and
wherein the method further comprises:
sending, by the wireless access point, a first extended schedule element to the terminal device before sending the new extended schedule element, wherein the first extended schedule element carries indication information that indicates that the multiple channels are allocated to the terminal device; wherein an allocation ID, a source association ID, and a destination association ID that are carried in the first extended schedule element are respectively consistent with an allocation ID, a source association ID, and a destination association ID that are carried in the allocation field of the new extended schedule element.

2. The method according to claim 1, wherein the channel extension type information comprises one bit and is used to indicate that the channel extension type of the multiple channels is channel aggregation or channel bonding;
wherein when a value of the one bit is 1, it indicates that the channel extension type of the multiple channels is channel bonding; and wherein when a value of the one bit is 0, it indicates that the channel extension type of the multiple channels is channel aggregation.

3. The method according to claim 1, wherein the channel allocation information comprises 8 bits, the 8 bits are used to indicate that the multiple channels are allocated to the terminal device by bit mapping;
wherein when a value of the one bit in the 8 bits is 1, it indicates that the corresponding channel is allocated; and wherein when a value of the one bit in the 8 bits is 0, it indicates that the corresponding channel is not allocated.

4. The method according to claim 3, wherein the capability information of the terminal device comprises one or more of the following: a maximum bandwidth of a single channel supported by the terminal device, and a maximum quantity of to-be-aggregated channels supported by the terminal device, wherein the maximum bandwidth of a single channel comprises 2.16 GHz, 4.32 GHz, 6.48 GHz, or 8.64 GHz.

5. The method according to claim 1, wherein the indication information comprises one bit, and if a value of the one bit is 1, it indicates that the multiple channels are allocated to the terminal device.

6. A resource allocation notification method, comprising:
sending, by a terminal device, capability information of the terminal device to a wireless access point, wherein the capability information of the terminal device comprises channel extension type information that indicates one or more channel extension types supported by the terminal device; and
receiving, by the terminal device, channel allocation information and channel extension type information sent by the wireless access point, the channel allocation information indicates that the terminal device sends and receives data on multiple channels, and the channel extension type information indicates one or more channel extension types of the multiple channels that the wireless access point determines to use,
wherein the channel allocation information and the channel extension type information are carried in a new extended schedule element;
wherein the new extended schedule element includes an element ID field, a length field, and multiple allocation fields, one allocation field includes the channel allocation information and the channel extension type information, and an element ID number carried in the element ID field in the new extended schedule element is different from an element ID number carried in an existing extended schedule element, and wherein the method further comprises:
receiving, by the terminal device, a first extended schedule element from the wireless access point before receiving the new extended schedule element, wherein the first extended schedule element carries indication information that indicates that the multiple channels are allocated to the terminal device; and wherein an allocation ID, a source association ID, and a destination association ID that are carried in the first extended schedule element are respectively consistent with an allocation ID, a source association ID, and a destination association ID that are carried in the allocation field of the new extended schedule element.

7. The method according to claim 6, wherein the one or more channel extension types comprise channel aggregation and channel bonding, and the channel extension type information comprises one bit and is used to indicate that the channel extension type of the multiple channels is channel aggregation or channel bonding;
wherein when a value of the one bit is 1, it indicates that the channel extension type of the multiple channels is channel bonding; and wherein when a value of the one bit is 0, it indicates that the channel extension type of the multiple channels is channel aggregation.

8. The method according to claim 6, wherein the channel allocation information comprises 8 bits, the 8 bits are used to indicate that the multiple channels are allocated to the terminal device by bit mapping;
wherein when a value of the one bit in the 8 bits is 1, it indicates that the corresponding channel is allocated; and wherein when a value of the one bit in the 8 bits is 0, it indicates that the corresponding channel is not allocated.

9. The method according to claim 8, wherein, in response to the wireless access point allocating multiple channels to the terminal device, the method further comprises:
after correctly receiving data, sending, by the terminal device, ACK information to the wireless access point on a bonded channel, wherein the bonded channel is formed by bonding at least two of the multiple channels.

10. The method according to claim 8, wherein, in response to the wireless access point allocating multiple channels to the terminal device, the method further comprises:
after correctly receiving data, sending, by the terminal device, multi-channel ACK information on one or more of the multiple channels, wherein the multi-channel ACK information indicates data acknowledgement information on each of the multiple channels.

11. The method according to claim 8, wherein, in response to the wireless access point allocating multiple channels to the terminal device, the method further comprises:
after correctly receiving data, sending, by the terminal device, multi-channel ACK information on one or more of the multiple channels, wherein the multi-channel ACK information indicates data acknowledgement information on a bonded channel and data acknowledgement information on another channel, and the multiple channels comprise the bonded channel and the another channel.

12. A wireless access point, comprising:
a transceiver, configured to:
receive capability information of a terminal device, wherein the capability information of the terminal device comprises one or more channel extension types supported by the terminal device; and send channel allocation information and channel extension type information to the terminal device, wherein the channel allocation information indicates that the terminal device sends and receives data on multiple channels, and the channel extension type information indicates the one or more channel extension types of the multiple channels that the wireless access point determines to use; and a processor, configured to:

determine, according to the capability information of the terminal device, to use the one or more channel extension types to allocate the multiple channels to the terminal device; and generate the channel allocation information and the channel extension type information;

wherein the channel allocation information and the channel extension type information are carried in a new extended schedule element;

wherein the new extended schedule element includes an element ID field, a length field, and multiple allocation fields; one allocation field includes the channel allocation information and the channel extension type information; and an element ID number carried in the element ID field in the new extended schedule element is different from an element ID number carried in an existing extended schedule element, and wherein the method further comprises:

sending, by the transceiver, a first extended schedule element to the terminal device before sending the new extended schedule element, wherein the first extended schedule element carries indication information that indicates that the multiple channels are allocated to the terminal device; and wherein an allocation ID, a source association ID, and a destination association ID that are carried in the first extended schedule element are respectively consistent with an allocation ID, a source association ID, and a destination association ID that are carried in the allocation field of the new extended schedule element.

13. The wireless access point according to claim 12, wherein the one or more channel extension types comprise channel aggregation and channel bonding, and the channel extension type information comprises one bit and is used to indicate that the channel extension type of the multiple channels is channel aggregation or channel bonding;

wherein when a value of the one bit is 1, it indicates that the channel extension type of the multiple channels is channel bonding; and wherein when a value of the one bit is 0, it indicates that the channel extension type of the multiple channels is channel aggregation.

14. The wireless access point according to claim 12, wherein the channel allocation information comprises 8 bits, the 8 bits are used to indicate that the multiple channels are allocated to the terminal device by bit mapping;

wherein when a value of the one bit in the 8 bits is 1, it indicates that the corresponding channel is allocated; and wherein when a value of the one bit in the 8 bits is 0, it indicates that the corresponding channel is not allocated.

15. The wireless access point according to claim 14, wherein the capability information of the terminal device comprises one or more of the following: a maximum bandwidth of a single channel supported by the terminal device, and a maximum quantity of to-be-aggregated channels supported by the terminal device, wherein the maximum bandwidth of a single channel comprises 2.16 GHz, 4.32 GHz, 6.48 GHz, or 8.64 GHz.

16. The wireless access point according to claim 12, wherein the indication information comprises one bit, and if a value of the one bit is 1, it indicates that the multiple channels are allocated to the terminal device.

17. A terminal device, comprising:

a processor, configured to: generate capability information of the terminal device;

a transceiver, configured to:

send the capability information of the terminal device to a wireless access point wherein the capability information of the terminal device comprises one or more channel extension types supported by the terminal device; and receive channel allocation information and channel extension type information sent by the wireless access point, wherein the channel allocation information indicates that the terminal device sends and receives data on multiple channels; and the channel extension type information indicates the one or more channel extension types of the multiple channels that the wireless access point determines to use, wherein the channel allocation information and the channel extension type information are carried in a new extended schedule element;

wherein the new extended schedule element includes an element ID field, a length field, and multiple allocation fields, one allocation field includes the channel allocation information and the channel extension type information, and an element ID number carried in the element ID field in the new extended schedule element is different from an element ID number carried in an existing extended schedule element, and wherein the transceiver is further configured to:

receive a first extended schedule element from the wireless access point before receiving the new extended schedule element, wherein the first extended schedule element carries indication information that indicates that the multiple channels are allocated to the terminal device; and wherein an allocation ID, a source association ID, and a destination association ID that are carried in the first extended schedule element are respectively consistent with an allocation ID, a source association ID, and a destination association ID that are carried in the allocation field of the new extended schedule element.

18. The terminal device according to claim 17, wherein the channel extension type information comprises one bit and is used to indicate that the channel extension type of the multiple channels is channel aggregation or channel bonding; wherein when a value of the one bit of the channel extension type information is 1, it indicates that the channel extension type of the multiple channels is channel bonding; and wherein when a value of the one bit of the channel extension type information is 0, it indicates that the channel extension type of the multiple channels is channel aggregation.

19. The terminal device according to claim 17, wherein the channel allocation information comprises 8 bits, the 8 bits are used to indicate that the multiple channels are allocated to the terminal device by means of bit mapping wherein when a value of the one bit in the 8 bits is 1, it indicates that the corresponding channel is allocated; and wherein when a value of the one bit in the 8 bits is 0, it indicates that the corresponding channel is not allocated.

* * * * *

UNITED STATES PATENT AND TRADEMARK OFFICE
CERTIFICATE OF CORRECTION

PATENT NO. : 11,051,307 B2
APPLICATION NO. : 16/212104
DATED : June 29, 2021
INVENTOR(S) : Huang et al.

Page 1 of 1

It is certified that error appears in the above-identified patent and that said Letters Patent is hereby corrected as shown below:

On the Title Page

Page 2, item (56) Other Publications, Line 24: "VERMA et al., "Witi on steroids: 802.11AC and 802.11AD," IEEE" should read -- VERMA et al., "Wifi on steroids: 802.11AC and 802.11AD," IEEE --.

Signed and Sealed this
Second Day of August, 2022

Katherine Kelly Vidal
*Director of the United States Patent and Trademark Office*